United States Patent [19]

Eickemeyer et al.

[11] Patent Number: 5,197,135
[45] Date of Patent: Mar. 23, 1993

[54] MEMORY MANAGEMENT FOR SCALABLE COMPOUND INSTRUCTION SET MACHINES WITH IN-MEMORY COMPOUNDING

[75] Inventors: Richard J. Eickemeyer, Endicott; Stamatis Vassiliadis, Vestal; Bartholomew Blaner, Newark Valley, all of N.Y.

[73] Assignee: International Business Machines Corporation, Armonk, N.Y.

[21] Appl. No.: 543,458

[22] Filed: Jun. 26, 1990

[51] Int. Cl.$^5$ .............................................. G06F 9/38
[52] U.S. Cl. ................................. 395/375; 395/800; 364/DIG. 1; 364/262.4; 364/262.9; 364/263; 364/261; 364/261.1; 364/261.2
[58] Field of Search ................ 395/375, 800, 775, 650

[56] References Cited

U.S. PATENT DOCUMENTS

| | | | |
|---|---|---|---|
| 4,439,828 | 3/1984 | Martin | 364/200 |
| 4,466,057 | 8/1984 | Houseman et al. | 395/375 |
| 4,722,049 | 1/1988 | Lahti | 395/375 |
| 5,086,408 | 2/1992 | Sakata | 395/600 |

OTHER PUBLICATIONS

Acosta, R. D., et al., "An Instruction Issuing Approach to Enhancing Performance in Multiple Functional Unit Processors", IEEE Transactions on Computers, Fall, C-35, No. 9, Sep. 1986, pp. 815-828.

Anderson, V. W., et al, the IBM System/360 Model 91: "Machine Philosophy and Instruction Handling", computer structures: Principles and Examples (Siewiorek, et al, ed (McGraw-Hill, 1982, pp. 276-292.

Capozzi, A. J., et al, "Non-Sequential High-Performance Processing", IBM Technical Disclosure Bulletin, vol. 27, No. 5, Oct. 1984, pp. 2842-2844.

Chan, S., et al, "Building Parallelism into the Instruction Pipeline", High Performance Systems, Dec., 1989, pp. 53-60.

Murakami, K, et al, "SIMP (Single Instruction Stream/Multiple Instruction Pipelining); A Novel High-Speed Single Processor Architecture", Proceedings of the Sixteenth Annual Symposium on Computer Architecture, 1989, pp. 78-85.

Smith, J. E., "Dynamic Instructions Scheduling and the Astronautics ZS-1", IEEE Computer, Jul., 1989, pp. 21-35.

Smith, M. D., et al, "Limits on Multiple Instruction Issue", ASPLOS III, 1989, pp. 290-302.

Tomasulo, R. M., "An Efficient Algorithm for Exploiting Multiple Arithmetic Units", Computer Structures, Principles, and Examples (Siewiorek, et al ed), McGraw-Hill, 1982, pp. 293-302.

Wulf, P. S., "The WM Computer Architecture", Computer Architecture News, vol. 16, No. 1, Mar. 1988, pp. 70-84.

(List continued on next page.)

Primary Examiner—Kevin A. Kriess
Attorney, Agent, or Firm—Baker, Maxham, Jester & Meador

[57] ABSTRACT

A digital computer system is described which is capable of processing 2 or more computer instructions in parallel and which has the capability of generating compounding tag information for those instructions, the compounding tag information being associated with instructions for the purpose of indicating groups of instructions which are to be concurrently executed. A compounding tag has a value which indicates the size of the group of instructions which are to be concurrently executed. The computer system includes a hierarchically-arranged memory which provides instructions to a CPU for execution. The instructions are compounded in the memory, and provision is made in the memory for storage of their compounding tags. In the event of modification of an instruction in memory, the invention provides for reduction of the value of the compounding tags for the modified instruction and instructions which are capable of being compounded with the modified instruction or for generation of new tag values for the modified instruction and instructions which are adjacent it in memory.

15 Claims, 15 Drawing Sheets

OTHER PUBLICATIONS

Jouppi, N. P., et al, "Available Instruction-Level Parallelism for Superscalar Pipelined Machines", ASPLOS III, 1989, pp. 272-282.

Jouppi, N. P., "The Non-Uniform Distribution of Instruction-Level and Machine Parallelism and its Effect on Performance", IEEE Transactions on Computers, vol. 38, No. 12, Dec., 1989, pp. 1645-1658.

Ryan, D. E., "Entails 80960: An Architecture Optimized for Embedded Control", IEEE Microcomputers, vol. 8, No. 3, Jun. 1988, pp. 63-76.

Coldwell, R. P., et al, "A VLIW Architecture for a Trace Scheduling Compiler", IEEE Transactions on Computers, vol. 37, No. 8, Aug., 1988, pp. 967-979.

Fisher, J. A., "The VLIW Machine: A Multi-Processor for Compiling Scientific Code", IEEE Computer, Jul., 1984, pp. 45-53.

Berenbaum, A. D., "Introduction to the CRISP Instruction Set Architecture", Proceedings of Compcon, Spring, 1987, pp. 86-89.

Bandyopadhyay, S., et al, "Compiling for the CRISP Microprocessor", Proceedings of Compcon, Spring, 1987, pp. 96-100.

Hennessey, J., et al, "MIPS: A VSI Processor Architecture", Proceedings of the CMU Conference on VLSI Systems and Computations, 1981, pp. 337-346.

Patterson, E. A., "Reduced Instruction Set Computers", Communications of the ACM, vol. 28, No. 1, (Jan., 1985, pp. 8-21.

Radin, G., "The 801 Mini-Computer", IBM Journal of Research and Development, vol. 27, No. 3, May, 1983, pp. 237-246.

Ditzel, D. R., et al, "Branch Folding in the CRISP eration, IBM Enterprise Systems Architecture/370, 1988.

The Architecture of Pipelined Computers, by Peter M. Kogge Hemisphere Publishing Corporation, 1981.

IBM Technical Disclosure Bulletin (vol. 33 No. 10A, Mar. 1991), by R. J. Eberhard.

Lee, J. K. F., et al, "Branch Prediction Strategies in Branch Target Buffer Design", IEEE Computer, vol. 17, No. 1, Jan. 1984, pp. 6-22.

Riseman, E. M., "The Inhibition of Potential Parallelism by Conditional Jumps", IEEE Transactions on Computers, Dec., 1972, pp. 1405-1411.

Smith, J. E., "A Study of Branch Prediction Strategies", IEEE Proceedings of the Eight Annual Symposium on Computer Architecture, May 1981, pp. 135-148.

Archibold, James, et al, Cache Coherence Protocols: "Evaluation Using a Multiprocessor Simulation Model", ACM Transactions on Computer Systems, vol. 4, No. 4, Nov. 1986, pp. 273-398.

Baer, J. L., et al "Multi-Level Cache Hierarchies: Organizations, Protocols, and Performance" Journal of Parallel and Distributed Computing vol. 6, 1989, pp. 451-476.

Smith, A. J., "Cache Memories", Computing Surveys, vol. 14, No 3 Sep., 1982, pp. 473-530.

Smith, J. E., et al, "A Study of Instructions Cache Organizations and Replacement Policies", IEEE Proceedings of the Tenth Annual International Symposium on Computer Architecture, Jun., 1983, pp. 132-137.

Vassiliadis, S., et al, "Condition Code Predictory for Fixed-Arithmetic Units", International Journal of Electronics, vol. 66, No. 6, 1989, pp. 887-890.

Tucker, S. G., "The IBM 3090 System: An Overview", IBM Systems Journal, vol. 25, No. 1, 1986, pp. 4-19.

IBM Publication NO. SA22-7200-0, Principles of Op-Microprocessor: Reducing Branch Delay to Zero", Proceedings of Compcon, Spring 1987, pp. 2-9.

Hwu, W. W., et al, "Checkpoint Repair for High-Performance Out-of-Order Execution Machines", IEEE Transactions on Computers, vol. C36, No. 12, Dec., 1987, pp. 1496-1594.

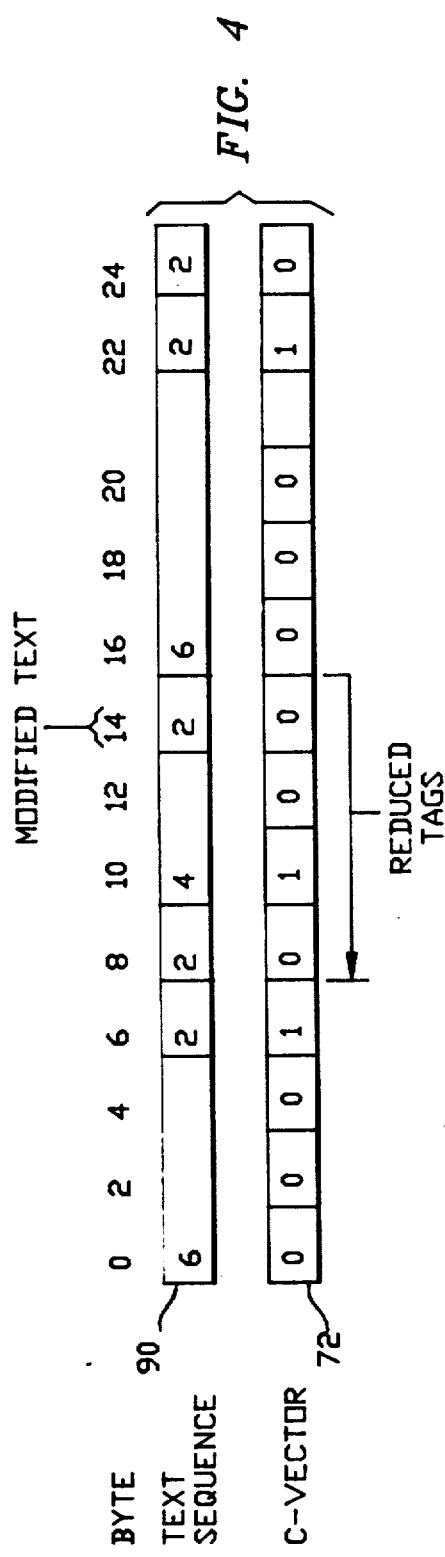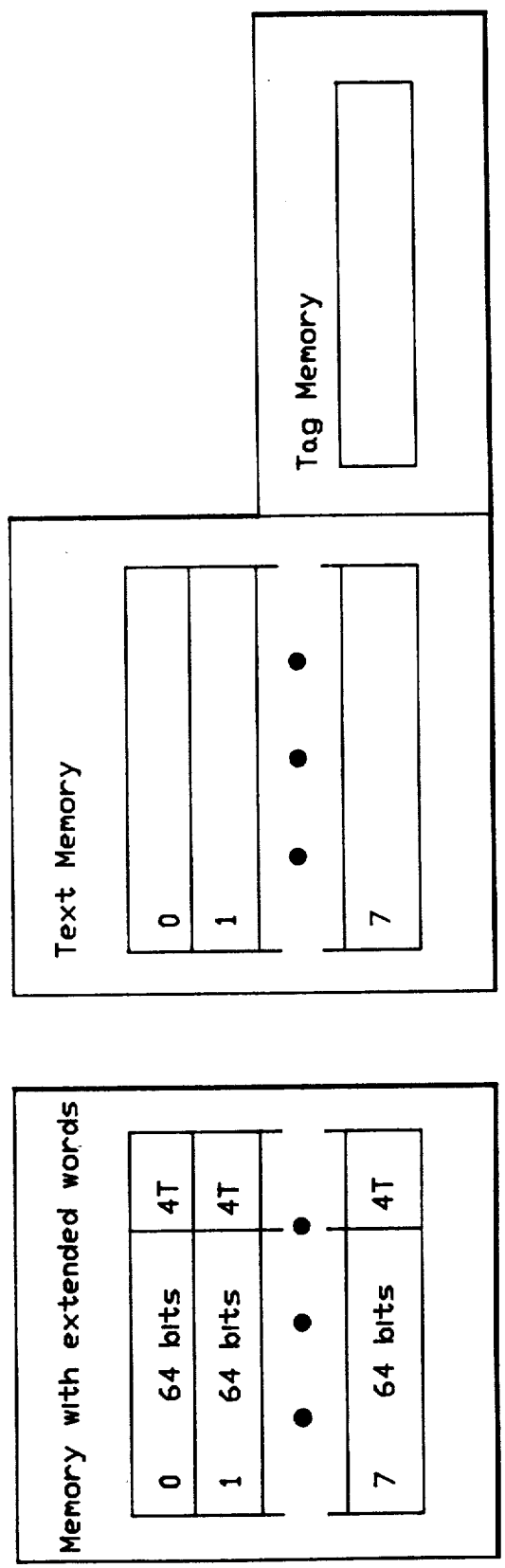

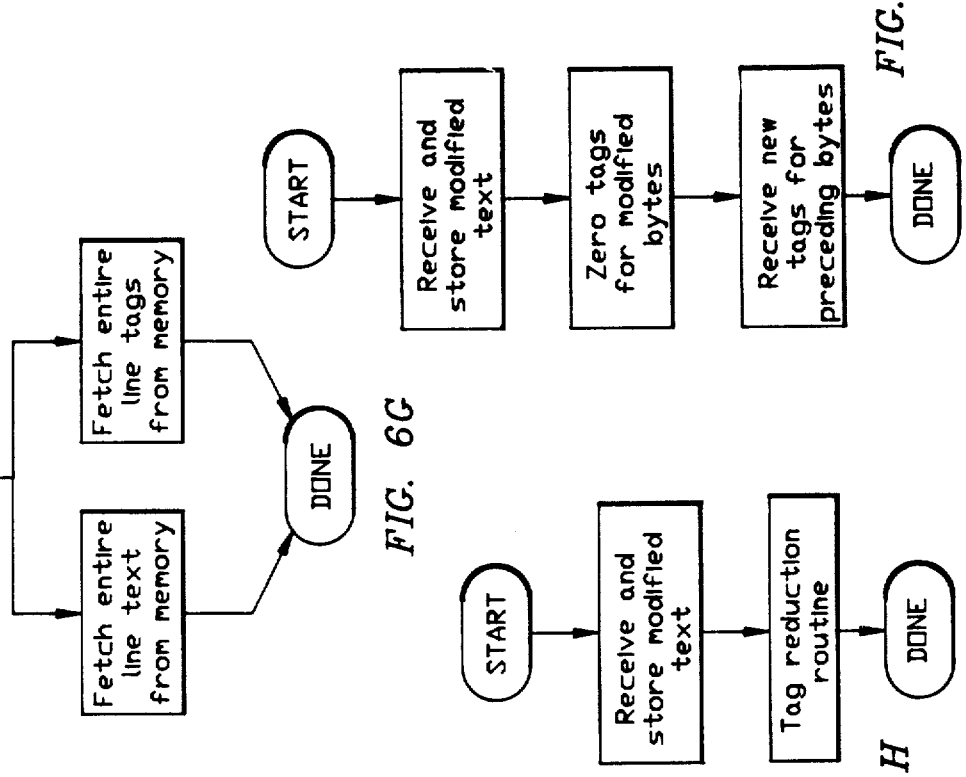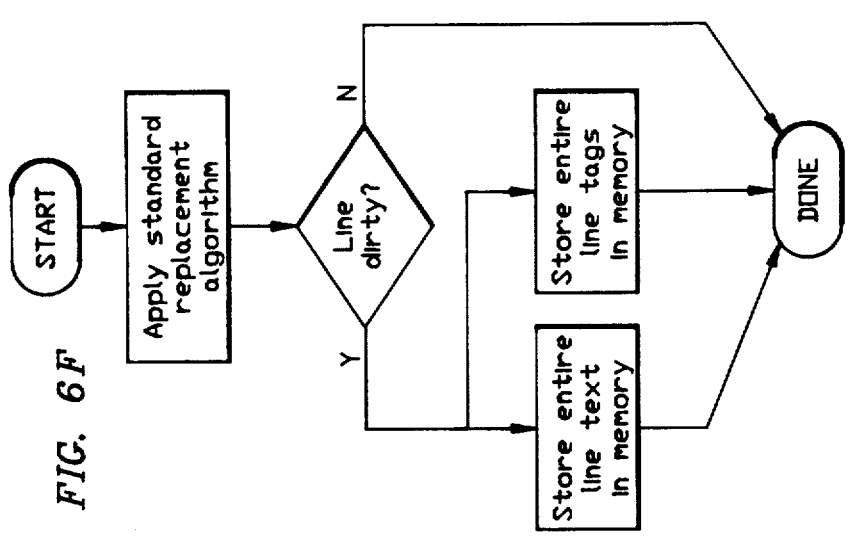

MEMORY MANAGEMENT FOR SCALABLE COMPOUND INSTRUCTION SET MACHINES WITH IN-MEMORY COMPOUNDING

CROSS REFERENCE TO RELATED APPLICATIONS

The present United States patent application is related to the following co-pending United States patent applications:
(1) application Ser. No.: 07/519,384 filed May 4, 1990, entitled "Scalable Compound Instruction Set Machine Architecture", the inventors being Stamatis Vassiliadis et al;
(2) application Ser. No.: 07/519,382 filed May 4, 1990, entitled "General Purpose Compound Apparatus For Instruction-Level Parallel Processors", the inventors being Richard J. Eickemeyer et al;
(3) application Ser. No.: 07/504,910 filed Apr. 4, 1990, entitled "Data Dependency Collapsing Hardware Apparatus", the inventors being Stamatis Vassiliadis et al, now U.S. Pat. No. 5,051,940;
(4) application Ser. No.: 07/522,291 filed May 10, 1990, entitled "Compounding Preprocessor For Cache", the inventors being Bartholomew Blaner et al; and
(5) application Ser. No.: 07/543,464 filed Jun. 26, 1990, entitled "An In-Memory Preprocessor for a Scalable compound Instruction Set Machine Processor, the inventors being Richard Eickemeyer et al.

These co-pending applications and the present application are owned by one and the same assignee, namely, International Business Machines Corporation of Armonk, N.Y.

The descriptions set forth in these co-pending applications are hereby incorporated into the present application by this reference thereto.

BACKGROUND OF THE INVENTION

This invention relates to digital computers and digital data processors, and particularly to digital computers and data processors capable of executing two or more instructions in parallel.

Traditional computers which receive a sequence of instructions and execute the sequence one instruction at a time are known. The instructions executed by these computers operate on single-valued objects, hence the name "scalar" for these computers.

The operational speed of traditional scalar computers has been pushed to its limits by advances in circuit technology, computer mechanisms, and computer architecture. However, with each new generation of competing machines, new acceleration mechanisms must be discovered for traditional scalar machines.

A recent mechanism for accelerating the computational speed of uni-processors is found in reduced instruction set architecture that employs a limited set of very simple instructions. Another acceleration mechanism is complex instruction set architecture which is based upon a minimal set of complex multi-operand instructions. Application of either of these approaches to an existing scalar computer would require a fundamental alteration of the instruction set and architecture of the machine. Such a far-reaching transformation is fraught with expense, downtime, and an initial reduction in the machine's reliability and availability.

In an effort to apply to scalar machines some of the benefits realized with instruction set reduction, so-called "superscalar" computers have been developed. These machines are essentially scalar machines whose performance is increased by adapting them to execute more than one instruction at a time from an instruction stream including a sequence of single scalar instructions. These machines typically decide at instruction execution time whether two or more instructions in a sequence of scalar instructions may be executed in parallel. The decision is based upon the operation codes (OP codes) of the instructions and on data dependencies which may exist between instructions. An OP code signifies the computational hardware required for an instruction. In general, it is not possible to concurrently execute two or more instructions which utilize the same hardware (a hardware dependency) or the same operand (a data dependency). These hardware and data dependencies prevent the parallel execution of some instruction combinations. In these cases, the affected instructions are executed serially. This, of course, reduces the performance of a super scalar machine.

Superscalar computers suffer from disadvantages which it is desirable to minimize. A concrete amount of time is consumed in deciding at instruction execution time which instructions can be executed in parallel. This time cannot be readily masked by overlapping with other machine operations. This disadvantage becomes more pronounced as the complexity of the instruction set architecture increases. Also, the parallel execution decision must be repeated each time the same instructions are to be executed.

In extending the useful lifetime of existing scalar computers, every means of accelerating execution is vital. However, acceleration by means of reduced instruction set architecture, complex instruction set architecture, or superscalar techniques is potentially too costly or too disadvantageous to consider for an existing scalar machine. It would be preferred to accelerate the speed of execution of such a computer by parallel, or concurrent, execution of instructions in an existing instruction set without requiring change of the instruction set, change of machine architecture, or extension of the time required for instruction execution.

SUMMARY OF THE INVENTION

In co-pending patent application Ser. No. 07/519,384 a scalable compound instruction set machine (SCISM) architecture is proposed in which instruction level parallelism is achieved by statically analyzing a sequence of scalar instruction at a time prior to instruction execution to generate compound instructions formed by adjacent grouping of existing instructions in the sequence which are capable of parallel execution. Relevant control information in the form of compound tags is added to the instruction stream to indicate where a compound instruction starts, as well as to indicate the number of existing instructions which are incorporated into a compound instruction. Relatedly, when used herein, the term "compounding" refers to the grouping of instructions contained in a sequence of instructions, the grouping being for the purpose of concurrent or parallel execution of the grouped instructions. At minimum, compounding is satisfied by "pairing" of two instructions for simultaneous execution. Preferably, compounded instructions are unaltered from the forms they have when presented for scalar execution. As explained below, compounded instructions are signified by compounding tag information, that is, bits accompanying the grouped instructions which denote the grouping of the instructions for parallel execution.

In a digital computer system which includes a means for executing a plurality of instructions in parallel, a particularly advantageous embodiment of the invention of this application is based upon a memory architecture which provides for compounding of instructions prior to their issue and execution. This memory structure provides instructions to the CPU (central processing unit) of a computer. Typically, a hierarchical memory structure includes a high-speed cache storage containing currently accessed instructions, a medium speed main memory connected to the cache, and a low-speed, high-capacity auxiliary storage. Typically, the cache and main storage (referred to collectively as "real storage") contain instructions which can be directly referenced for execution. Access to instructions in the auxiliary storage is had through an input/output (I/O) adaptor connected between the main memory and the auxiliary storage.

In co-pending patent application Ser. No. 07/543,464, an in-memory preprocessor for a SCISM architecture is proposed in which an instruction compounding mechanism in real storage produces compounding tag information for a sequence of scalar instructions, the compounding tag information indicating instructions of the sequence which may be executed in parallel. The instruction compounding unit produces the compounding tag information as a page of instructions is being prefetched and stored in the main memory. Although the particular embodiment of that patent application teaches compounding of up to two instructions, it is contemplated that up to N instructions may be compounded for concurrent execution in a scalar computer.

In patent application Ser. No. 07/522,291, a compounding preprocessor for a cache in a hierarchical memory is disclosed in which the instruction compounding unit is located between the main memory and cache of a hierarchical storage organization. The instruction compounding unit produces compounding tag information for the instructions in a line of instructions being fetched into the cache from the main memory.

In both of these applications, instructions in the cache have accompanying compounding tags to which a plurality of parallel execution units respond by executing one or more of the instructions in a group of up to N instructions in parallel.

In either of these cases, if the program issues a WRITE into the instruction text, any compound tags associated with the modified text must be invalidated and that section of the code must be run without compounding for so long as it resides in the memory.

Typically, when text in a cache is modified by a WRITE, the modified text is placed back into the cache by merging it with a line of text obtained from the cache. In this regard, merging means that the modified text is placed into the line of text containing its prior unmodified form at the location in the line where the prior form occurs.

The invention can be understood in the context of a computer system capable of concurrently executing up to N instructions in a sequence of scalar instructions, the sequence including compounding tags which accompany the scalar instructions and which are activated to indicate the instructions to be concurrently executed. The invention is a mechanism for managing the compounding tags of scalar instructions which are stored in the real storage of the computer system, and it includes a merging unit connected to the real memory for merging a modified instruction from the real memory with non-modified instructions in the real memory. A tag reduction unit connected to the merging unit and to the real memory deactivates the compounding tags of the modified instruction and N−1 instructions in the real memory with which the modified instruction could be compounded.

The invention is also expressed as a method practiced in a computer system, the computer system receiving a sequence of scalar instructions and including a compounder which groups instructions for concurrent execution by generating compounding tags for groups of instructions. The compounding tags are activated by the compounding unit for groups of up to N instructions to indicate that the instructions are to be concurrently executed. The method manages the compounding tags of instructions stored in the real memory of the computer system and includes the following steps:

during execution of an instruction stored in the real memory, modifying the instructions;

merging the instruction with instructions in the real memory;

reducing the compounding tags of the instructions; reducing the compounding tags of N−1 instructions in the real memory with which the instruction can be compounded.

Alternatively, the practice of this invention may include management of the compounding tags of scalar instructions which are stored in the real storage of a computer system by recompounding the tags of the modified instruction, the N−1 instructions preceding the modified instruction in real memory, and the N−1 instructions succeeding modified instruction in the real memory. In this case, compounding tag management consists simply of recompounding the modified instruction with the instructions which surround it in real memory.

For a better understanding of the invention, together with its advantages and features, reference is made to the following description and the below-described drawings.

BRIEF DESCRIPTION OF THE DRAWINGS

FIG. 4 is an analytical chart for instruction stream text which has been compounded by association of compounding tags.

FIGS. 5A and 5B illustrate alternative implementations of compounding tags in memory.

FIGS. 6A–6J are flow diagrams which illustrate how compounding tags are managed in the hierarchical memory organization of FIG. 3.

DETAILED DESCRIPTION OF THE PREFERRED EMBODIMENT

Figure 1:
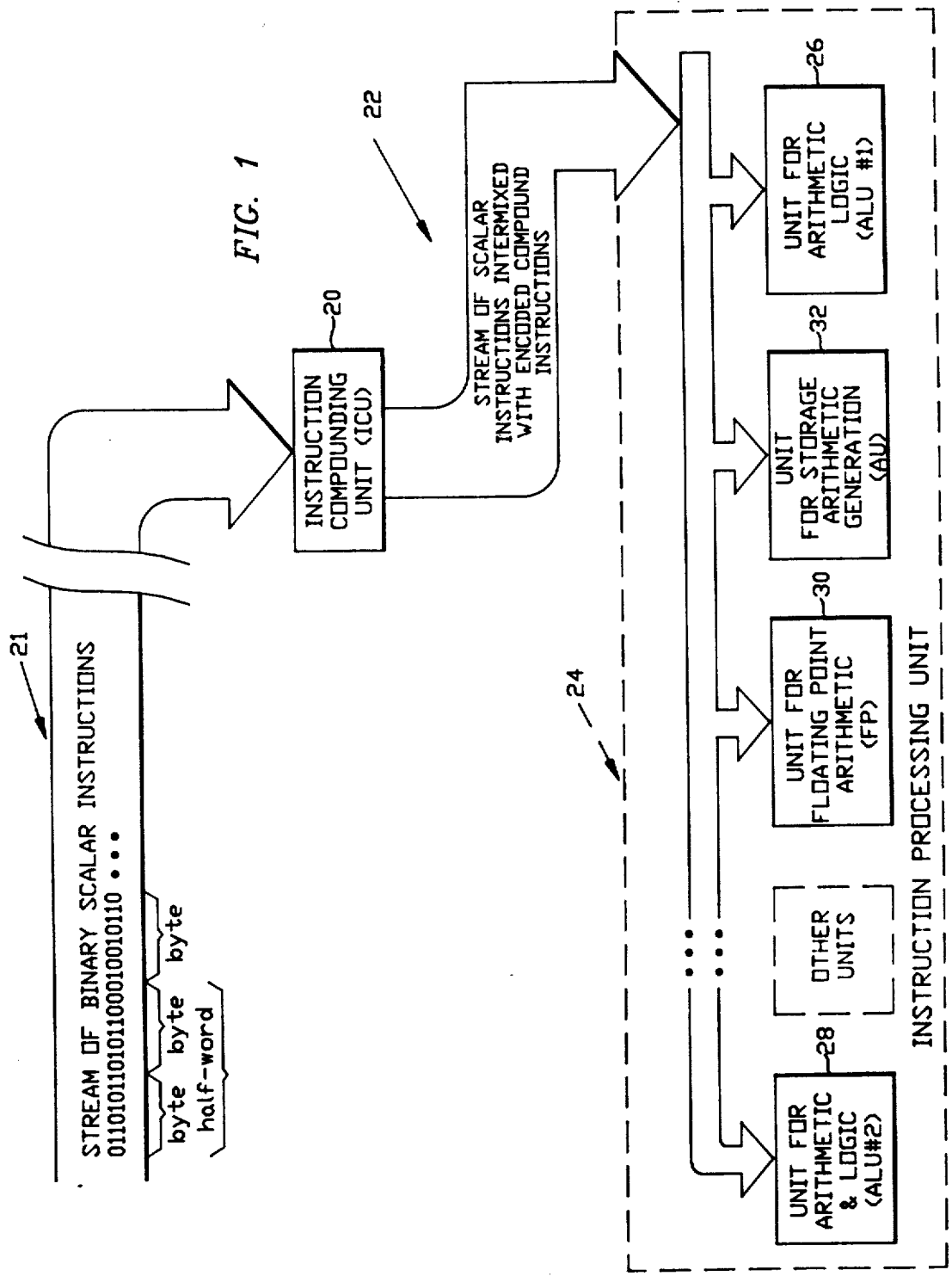
FIG. 1 is high-level schematic diagram of a computing system which is capable of compounding instructions in a sequence of scalar instructions for concurrent execution.

Referring to FIG. 1 of the drawings, there is shown a representative embodiment of a portion of a digital computer system for a digital data processing system constructed in accordance with the present invention. This computer system is capable of executing 2 or more instructions in parallel. The system includes the capability of compounding instructions for parallel or concurrent execution. In this regard, "compounding" refers to the grouping of a plurality of instructions in a sequence of scalar instructions, wherein the size of the grouping is scalable from 1 to N. For example, the sequence of scalar instructions could be drawn from an existing set of scalar instructions such as that used by the IBM System/370 products.

In order to support the concurrent execution of a group of up to N instructions, the computer system includes a plurality of instruction execution units which operate in parallel in a concurrent manner; each on its own, is capable of processing one or more types of machine-level instructions.

As is generally shown in FIG. 1, an instruction compounding unit 20 takes a stream of binary scalar instructions 21 and selectively groups some of the adjacent scalar instructions to form encoded compound instructions. A resulting compounded instruction stream 22, therefore, provides scalar instructions to be executed singly or in compound instructions formed by groups of scalar instructions to be executed in parallel. When a scalar instruction is presented to an instruction processing unit 24, it is routed to the appropriated one of a plurality of execution units for serial execution. When a compound instruction is presented to the instruction processing unit 24, its scalar components are each routed to an appropriate execution unit for simultaneous parallel execution. Typical functional units include, but are not limited to, an arithmetic logic unit (ALU) 26, 28 a floating point arithmetic unit (FP) 30 and a storage address generation unit (AU) 32.

It is understood that compounding is intended to facilitate the parallel issue and execution of instructions in all computer architecture capable of processing multiple instructions per cycle.

Figure 2:
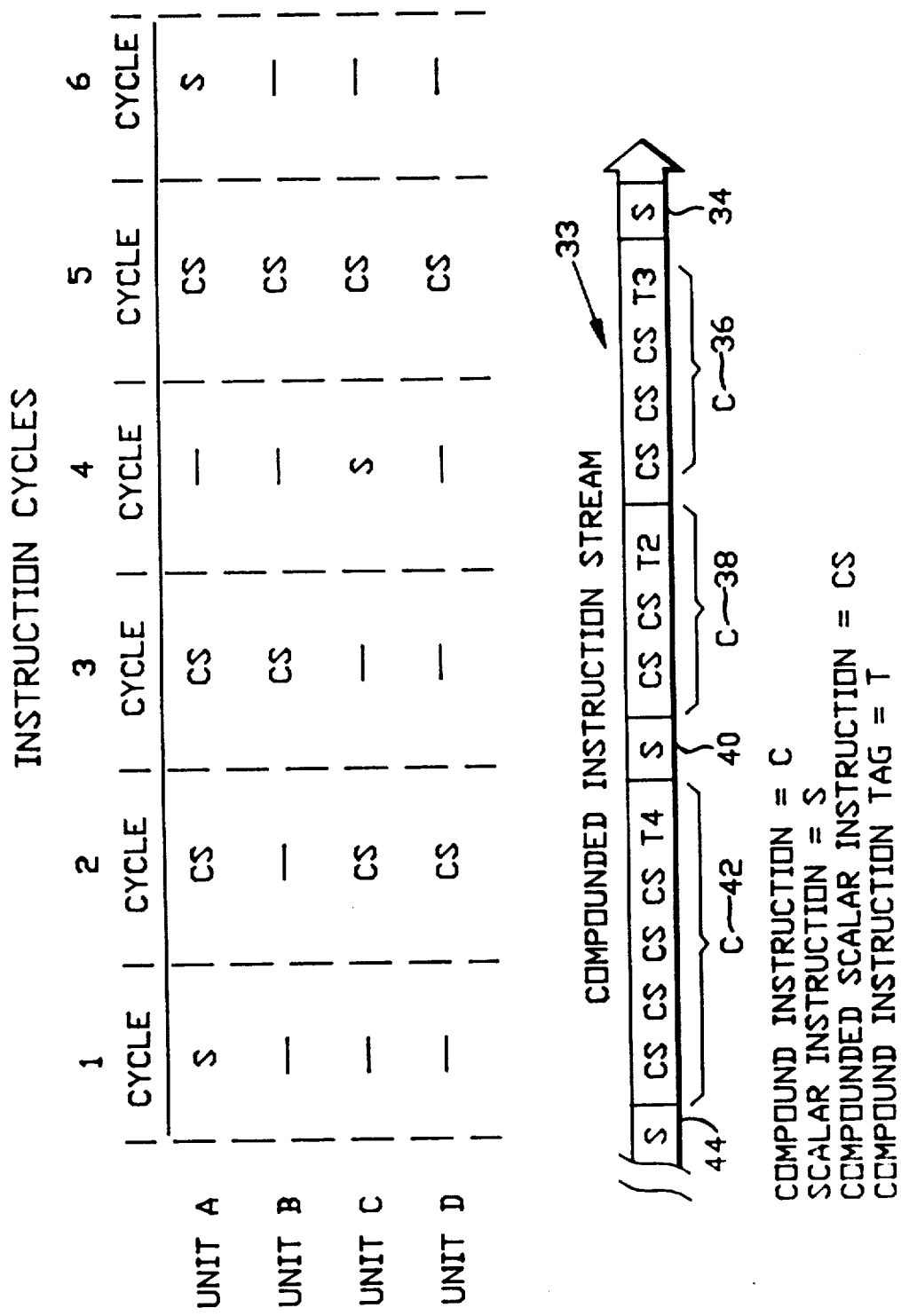
FIG. 2 is a timing diagram for a uni-processor implementation showing the parallel execution of certain instructions which have been selectively grouped in a compound instruction stream.

Referring now to FIG. 2, compounding can be implemented in a uni-processor environment where each functional unit executes a scalar instruction (S) or, alternatively, a compound instruction (CS). As shown in the drawing, an instruction stream 33 containing a sequence of scalar and compounded scalar instructions has control tags (T) associated with each compound instruction. Thus, a first scalar instruction 34 could be executed singly by functional unit A in cycle 1; a triplet compound instruction 36 identified by tag T3 could have its 3 compounded scalar instructions executed in parallel by functional units A, C, and D in cycle 2; another compound instruction 38 identified by tag T2 could have its pair of compounded scalar instructions executed in parallel by functional units A and B in cycle 3; a second scalar instruction 40 could be executed singly by functional unit C in cycle 4; a large group compound instruction 42 could have its 4 compounded scalar instructions executed in parallel by functional units A-D in cycle 5; and a third scalar instruction 44 could be executed singly by functional unit A in cycle 6.

One example of a computer architecture which can be adapted for handling compound instructions is an IBM System/370 instruction level architecture in which multiple scalar instructions can be issued for execution in each machine cycle. In this context, a machine cycle refers to a single pipeline stage required to execute a scalar instruction. When an instruction stream is compounded, adjacent scalar instructions are selectively grouped for the purpose of concurrent or parallel execution.

In general, an instruction compounding facility will look for classes of instructions that may be executed in parallel. When compatible sequences of instructions are found, a compound instruction is created.

Compounding, per se, is not the subject of this patent application. Reference is given to patent application Ser. No. 07/519,384 filed May 4, 1990, and U.S. patent application Ser. No. 07/519,382 filed May 4, 1990, for an understanding of compounding generally. An instantiation of an instruction compounding unit for pairwise compounding is given in U.S. patent application Ser. No. 07/543,464 filed Jun. 26, 1990.

Generally, it is useful to provide for compounding at a time prior to instruction issue so that the process can be done once for an instruction or instructions that may be executed many times. It has been proposed to locate the instruction compounding functionality in the real memory of a computer system in order to implement compounding in hardware, after compile time, yet prior to instruction issue. Such compounding is referred to as "in-memory compounding" and can be understood with reference to U.S. patent application Ser. No. 07/522,291 filed May 10, 1990, and U.S. patent application Ser. No. 07/543,464 filed Jun. 26, 1990.

Figure 3:
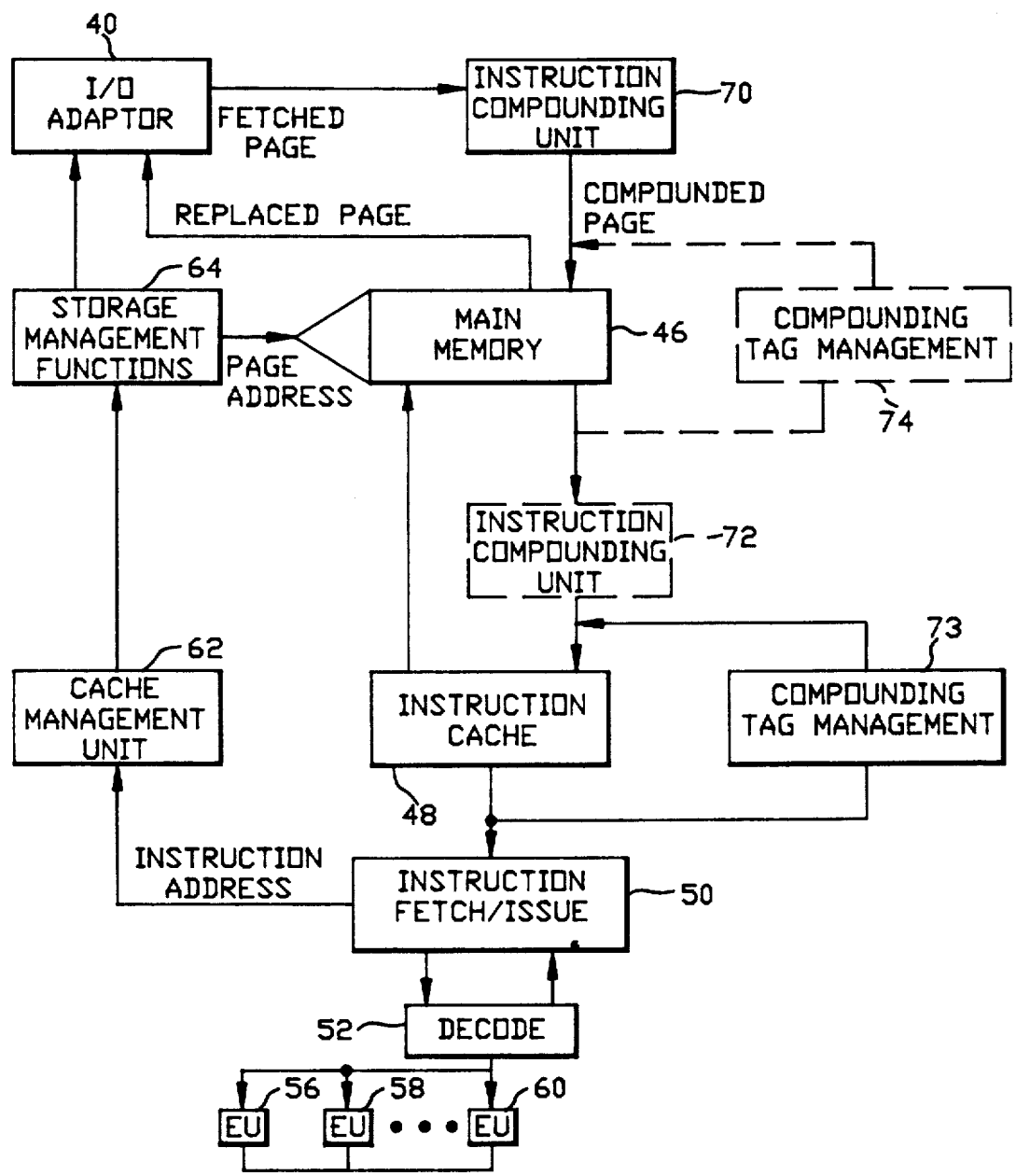
FIG. 3 is a block diagram of a hierarchical memory organization in a scalable compound instruction set machine with in-memory processing.

Generally, in-memory compounding is illustrated in FIG. 3. In FIG. 3, a hierarchical memory organization includes an I/O adaptor 40 which interfaces with auxiliary storage devices and with a computer real memory. The real memory of the organization includes a medium speed, relatively high capacity main memory 46 and a high-speed, relatively low capacity instruction cache 48. (The main memory and cache collectively are referred to herein as "real memory", "real storage", or, simply "memory".) A stream of instructions is brought in from auxiliary storage devices by way of the I/O adaptor 40, and stored in blocks called "pages" in the main memory 46. Sets of contiguous instructions called "lines" are moved from the main memory 46 to the instruction cache 48 where they are available for high-speed reference for processing by the instruction fetch and issue unit 50. Instructions which are fetched from the cache are issued, decoded at 52, and passed to the functional units 56, 58, . . . , 60 for execution.

During execution, when reference is made to an instruction which is in the program, the instruction's address is provided to a cache management unit 62 which uses the address to fetch one or more instructions, including addressed instruction, from the instruction cache 48 into the queue in the unit 50. If the addressed instruction is in the cache, a cache "hit" occurs. Otherwise, a cache "miss" occurs. A cache miss will cause the cache management unit 62 to send the line address of the requested instruction to a group of storage management functions 64. These functions can include, for example, real storage management functions which use the line address provided by the cache management unit 62 to determine whether the page containing the addressed line is in the main memory 46. If the page is in main memory, the real storage management will use the line address to transfer a line containing the missing instruction from the main memory 46 to the instruction cache 48. If the line containing the requested instruction is not in the main memory, the operating system will activate another storage management function, providing it with the identification of the page containing the needed line. Such a storage management function will send to the I/O adaptor 40 an address identifying the page containing the line. The I/O adaptor 40 will bring the page from auxiliary storage and provide it to the main memory 46. To make room for the fetched page, the storage management function selects a page in the main memory 46 to be replaced by the fetched page. In SCISM architecture, it is contemplated that the replaced page is returned to auxiliary storage through the I/O adaptor without compounding tag information. In this manner, those instructions most likely to be immediately required during execution of an instruction sequence are adjacent the functional units in the instruction cache 48. The hierarchical memory organization provides the capability for fast retrieval of instructions that are required but not in the cache.

In the context of SCISM architecture, in-memory instruction compounding can be provided by an instruction compounding unit 70 which is located functionally between the I/O adapter 40 and the main memory 46 so that compounding of the scalar instruction stream can take place at the input to, or in, the main memory 46. In this location, instructions can be compounded during an ongoing page fetch. Alternatively, the instruction compounding unit can occupy the position 72 between the main memory 46 and the instruction cache 48 and compound instructions are formed line-by-line as they are fetched into the instruction cache 48.

The particular technique for compounding is a matter of design choice. However, for purposes of illustration, a technique for creating compound instructions formed from adjacent scalar instructions is illustrated in FIG. 4. As FIG. 4 shows, instructions may occupy 6 bytes (3 half words), 4 bytes (2 half words), or 2 bytes (1 half word) of text. For this example, the rule for compounding a set of instructions which includes variable instruction lengths provides that all instructions which are 2 bytes or 4 bytes long are compoundable with each other. That is, a 2 byte instruction is capable of parallel execution in this particular example with another 2 byte or another 4 byte instruction and a 4 byte instruction is capable of parallel execution with another 2 byte or another 4 byte instruction. The rule further provides that all instructions which are 6 bytes long are not compoundable. Thus, a 6 byte instruction is only capable of execution singly by itself. Of course, compounding is not limited to these exemplary rules, but can embrace a plurality of rules which define the criteria for parallel execution of existing instructions in a specific configuration for a given computer architecture.

The instruction set used for this example is taken from the System/370 architecture. By examining the OP code for each instruction, the length of each instruction can be determined from an instruction length code (ILC) in the op code. The instruction's type is further defined in other op code bits. Once the type and length of the instruction is determined, a compounding tag containing tag bits is then generated for that specific instruction to denote whether it is to be compounded with one or more other instructions for parallel execution, or to be executed singly by itself.

In the example (which is not limiting), if 2 adjacent instructions can be compounded, the tag bits, which are generated in memory, are "1" for the first compounded instruction and "zero" for the second compounded instruction. However, if the first and second instructions cannot be compounded, the tag bit for the first instruction is "zero" and the second and third instructions are then considered for compounding. Once an instruction byte stream has been processed in accordance with the chosen compounding technique and the compounding bits encoded for various scalar instructions, more optimum results for achieving parallel execution may be obtained by using a bigger window for looking at larger groups of instructions and then picking the best combination of N instructions for compounding.

With the compounding example of FIG. 4, a C-vector 72 is generated which shows the values for compounding tag bits for the particular sequence 70 of instructions where pairwise compounding is employed. Based on the values of the compounding bits, the second and third instructions at text sequence byte positions 6-9 form a compounded pair as indicated by the "1" in the identifier bit for the second instruction. The fourth and fifth instruction at text byte locations 10-13 form another compounded pair as indicated by "1" in the identifier bit for the fourth instruction. The seventh and eighth instructions at byte locations 22 and 24 also form a compounded pair as indicated by the "1" in the identifier bit for the seventh instruction.

The compounding tags of the C-vector 72 are generated by the instruction compounding unit. In generating the tags, the compounding unit provides a compounding tag bit for each half word of the instruction text sequence. For compounding in general, the instruction compounding unit can generate a tag containing control information which is to accompany each instruction in the compounded text sequence; that is, tag bits are generated for each non-compounded scalar instruction as well as for each compounded scalar instruction in a group of N compounded instructions.

The example of compounding N instructions where N=2 provides the smallest grouping of scalar instructions to form a compound instruction, and uses the following preferred encoding procedure. It is asserted that all instructions are aligned on a half word (2 byte) boundary with lengths of either 2, 4, or 6 bytes, in which case, a tag is needed for every half word. In this small grouping example, a 1 bit tag indicates that an instruction beginning in the byte under consideration is compounded with the following instruction, while a "zero" indicates that the instruction beginning in the byte under consideration is not compounded. The tag bit associated with half words that do not contain the first byte of an instruction is ignored. The tag bit for the first byte of second instruction in the compounded pair is also ignored. As a result, this encoding procedure for tag bits means that in the simplest case, only 1 bit of information is needed for an instruction to identify a compounded instruction.

In the general case, where up to N scalar instructions can be grouped together to form a compound instruction, additional tag bits are required. The minimum number of bits needed to indicate the specific number of scalar instructions actually compounded is the logarithm to the base 2 (rounded up to the nearest whole number) of the maximum number N of scalar instructions that can be grouped to form a compounded instruction. Thus, in the example, N=2 and 1 tag bit is needed for each compound instruction. If N=3 or 4, 2 tag bits are needed for each compounded instruction.

There are a number of ways to implement the storage of compounding tags in memory as illustrated in FIGS. 5a and 5b. Both examples assume an 8 byte memory bus plus extra lines for tags, a 64 byte cache line as the basic memory transfer, and 1 tag bit for every 2 bytes of text in memory. One cache line is shown in each example. In keeping with the foregoing discussion, the number of compounding tag bits is determined by the maximum number N of instructions to be compounded and the information available to the compounder.

The simplest tag storage implementation is to increase the internal word size of the processor as illustrated in FIG. 5A. This implies that the tag bits are appended to instructions or inserted into the instruction stream at each half word. In FIG. 5A, a cache line organized into 8 storage locations is illustrated. Without compounding, each location is 8 bytes (64 bits) wide. With 8 locations, a 64 byte cache line is stored. With 1 compounding tag per half word, and 2-way compounding (N=2), a minimum of 1 compounding bit for every half word of instruction text is required. Thus, 4 compounding tag bits (T) are required for every 8 bytes. The implication is that the memory word size must be expanded from 64 to 68 bits. For 3 or 4 way compounding, a 2 bit compounding tag for each 2 bytes of instruction would require that the memory word size be extended to 72 bits. FIG. 5A illustrates a memory structure for the first case, that is, N=2 and an 8 byte memory bus. The memory bus and internal word size are expanded to 68 bits. The drawback to this scheme is that a new memory design is required implying, for example, error correction for larger words. A second approach is illustrated in FIG. 5B and utilizes a tag memory that is separate from, but operated in parallel with, the text memory. This structure implies that tags are separate from the instruction text. However, as with FIG. 5A, the tags accompanying their respective instructions, the parallel operation of FIG. 5B implies different memory bus lines. In this case, the internal memory word size is unchanged; however, the bus size might increase to accommodate parallel operation of the tag memory. This approach has several advantages over the wider word approach. First, the tag memory may cover only part of the words in main memory. If the operating system uses certain parts of the memory only for data pages, tags are not necessary over these parts. The design of FIG. 5B may be hardwired. Alternatively, a separate tag memory controller will be provided, commands to which will indicate that certain pages contain data only, in which case, the controller will not map the memory page address into a tag memory address for these pages. The second advantage is that the tag memory could be removed to produce a lower cost system. This broadens the performance range possible in a family of computers. If N-way compounding is employed and N is greater than 2, the growth in tag bits can be accommodated by substitution of new tag memory without requiring a change in the main memory design. In the design of FIG. 5B, each memory can have its own error correction. Relatedly, error correction is not necessary in tag memory, only error detection is needed. A detected tag bit error can always be "corrected" to all zeros, which will lose compounding, but maintain correct execution.

Other approaches to implementing tags are possible but are not illustrated. These other approaches are discussed at length in co-pending U.S. patent application Ser. No. 07/543,464, filed Jun. 26, 1990.

THE INVENTION

The result of instruction execution may require modification of an instruction in the executing program by alteration of one of its data fields. When the instruction is thus modified, all superseded copies of the instruction which are in memory must be replaced by the modified instruction. If the instruction is compounded with one or more other instructions, modification of the instruction may alter the compounding conditions. The conditions may be changed to the point where the instruction is no longer compoundable, is compoundable with fewer instructions than previously, or is compoundable only with different instructions. Alternatively, instruction modification may provide an opportunity for recompounding the instruction with its surrounding instructions.

In order to retain the benefits of compounding, without sacrificing data consistency when an instruction in a compounded stream is altered, the inventors have chosen two solutions. The first solution is to reduce compounding tag values in order to delete the altered instruction from a compounded instruction. This requires adjustment of the values of the compounding tags which precede the instruction in the instruction stream. The second solution is simply to recompound the instructions which surround the modified instruction. This may result in the generation of new compounding tags for these instructions.

Referring again to FIG. 3, a compounding tag management unit 73 according to the invention is illustrated in a feedback path around the instruction cache 48. In this location, compounding tag management by either tag reduction or recompounding can be activated in response to alteration of an instruction in the cache. Although only a single cache is illustrated in FIG. 3, it is contemplated that the invention may be practiced in a computer with plural CPUs and plural caches. For maintaining data coherence among all of the components of the real memory, the inventors assert that a compounding tag management unit 74 may also be located in a feedback path around the main memory 46 to accommodate compounding tag management of instructions in the real memory.

Compounding tag reduction is now explained from the standpoint of compounded instructions in the instruction cache 48. This explanation is not intended to be limiting, it being understood that cache coherence may require compounding tag reduction for instructions in the main memory 46 and for other caches which the system may include. Referring now to FIGS. 3 and 4, the C-vector 72 accompanies the text sequence 70 when the text sequence is stored in the instruction cache. Further, that each compounding tag bit in the C-vector 72 is associated with a respective 2 bytes of the text sequence 70. The cache management unit 62 monitors the address and length of fields that are overwritten. Now, assume that the text of an instruction in byte locations 14 and 15 is modified with a WRITE. Clearly, the tag for this instruction must be reduced to zero, as the compounding status of the instruction is no longer known. If it is assumed that the selected compounding procedure operates only on compounding tag bits associated with the first half word of an instruction, no tags after the changed bytes need to be altered. Thus, there is no need to change the C-vector bits associated with the text sequence in byte locations 16-23. Thus, disregarding for the moment the prohibition against compounding with 6 byte instructions, if the instruction at byte 14 were compounded with the instruction beginning at byte 16, the compounding tag bit indicating this would be associated with byte 14. This bit would have been invalidated with the WRITE. The tag for byte 16, which indicates compounding starting for the instruction at byte 16 and following instructions, is not affected by a change to bytes before byte 16. However, the compounding tags of the potential instructions that precede the changed instruction must be considered to accommodate the possibility that they may be in a compound instruction that includes the altered instruction. The maximum possible number of compounding tags to alter depends upon N, the maximum number of instructions that could be compounded, the maximum length L of compoundable instructions, and A the number of bytes covered by a compounding tag. In simple terms, the tags of the N−1 instructions preceding the first modified instruction that could be part of the same compound instruction must be considered for possible alteration. For example, if the largest compound instruction is made up of 2 four-byte instructions, then tags for the 6 bytes preceding the first modified half word must be analyzed. This is shown in FIG. 4 by the arrow labeled "reduced tags". Thus, with a WRITE to the instruction at byte 14, the compounding tag bits back to and including that for byte 8 of the text sequence must be considered for reduction.

In this invention, the "alteration" of compounding tag information can mean "invalidation" of compounding tags for up to the N−1 instructions which precede an altered instruction. In this regard, "invalidation" would mean that all of the compounding tags within this window could be reduced to zero if all of these instructions are compounded. This would not impede instruction execution as all of the instructions in this window would simply be executed sequentially. Alternatively, tag alteration according to the invention may involve decrementation of the compounding tag values for the (N−1) instructions preceding the modified bytes if this group includes instructions that were compounded with the modified instruction. The invention also contemplates neither invalidation nor decrementation of the compounding tag of bytes preceding modified bytes if those tags indicate no compounding with the modified bytes.

Figure 6A:
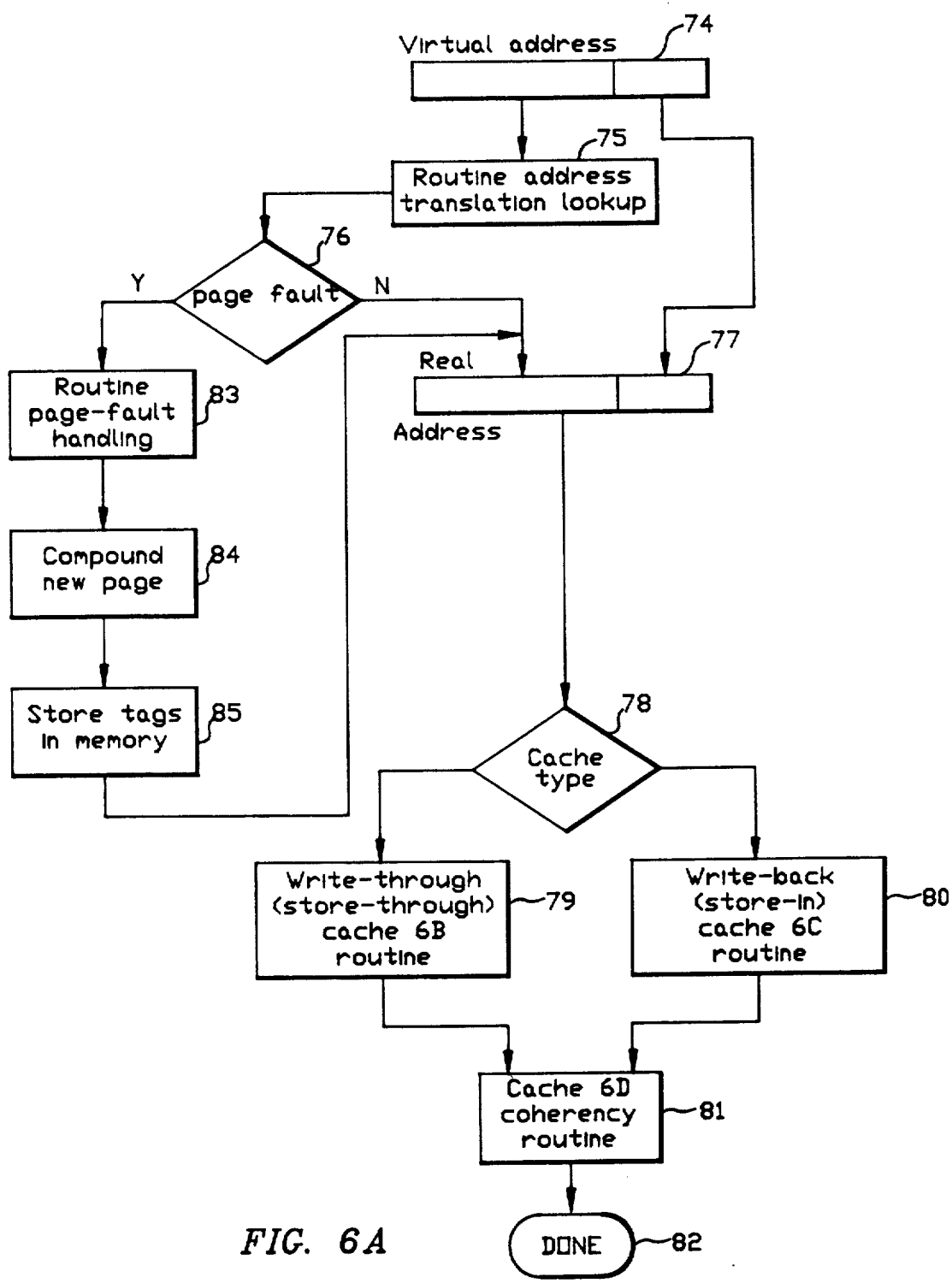
Figure 6B:
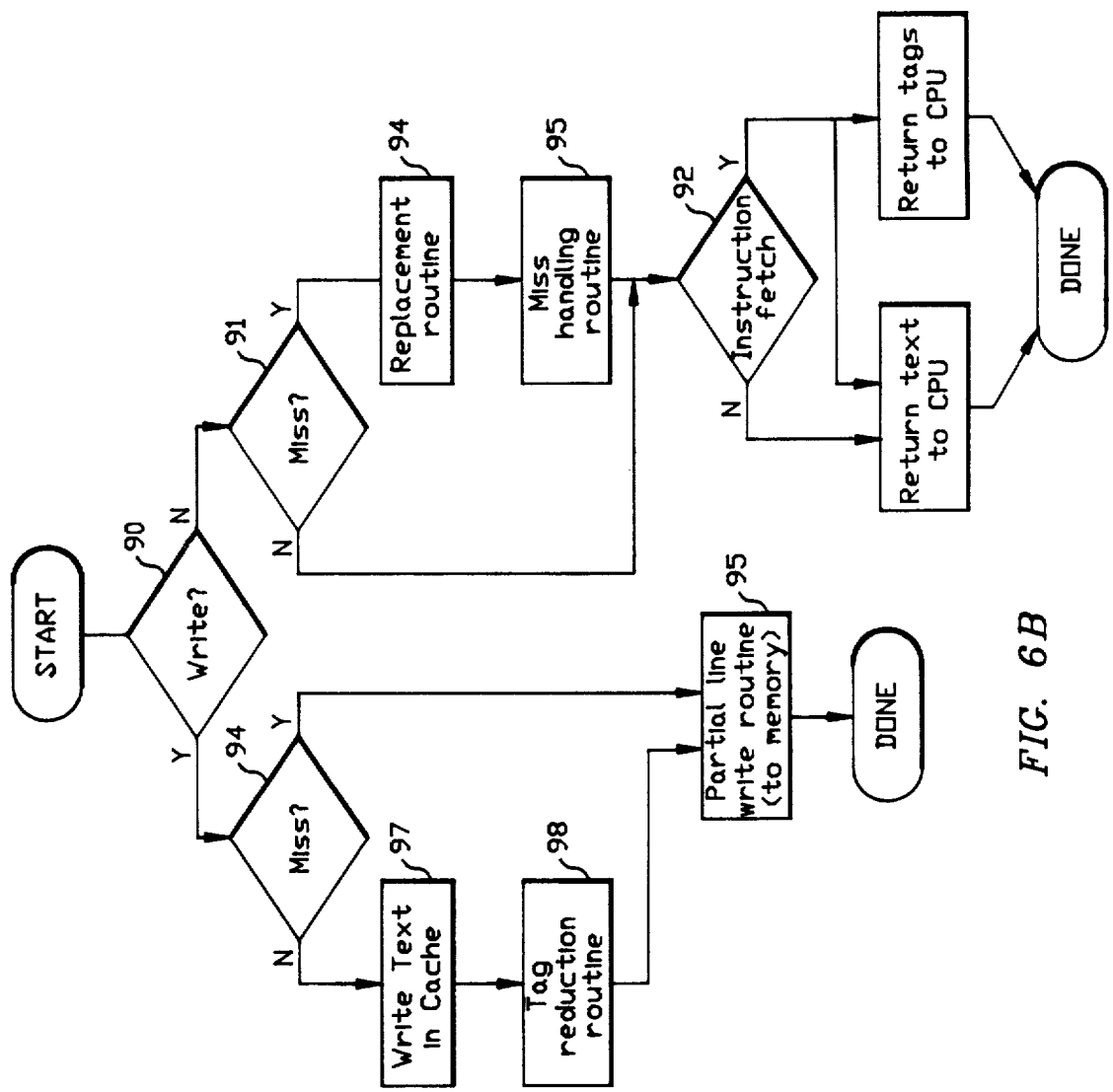
Figure 6C:
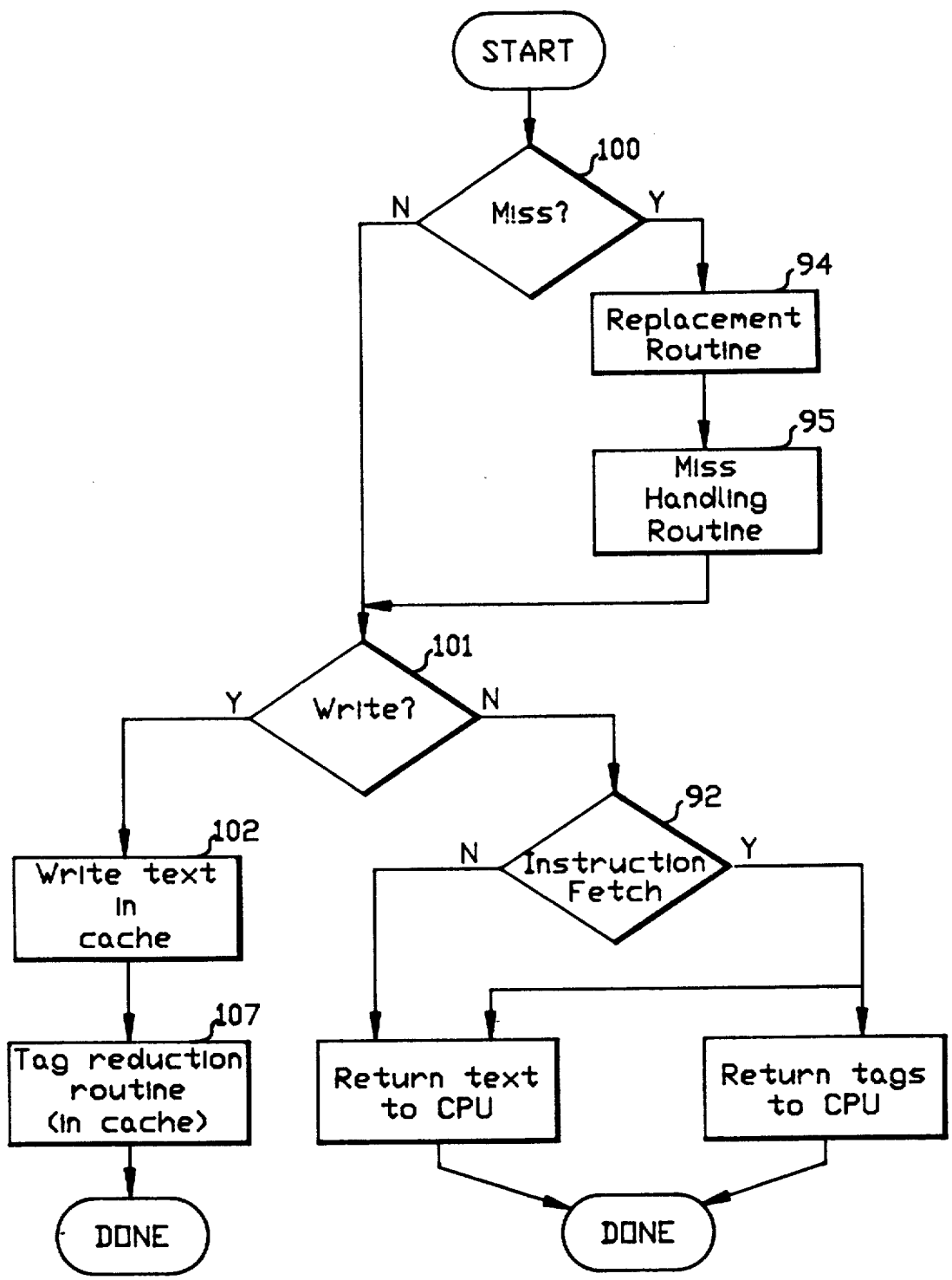
Figure 6D:
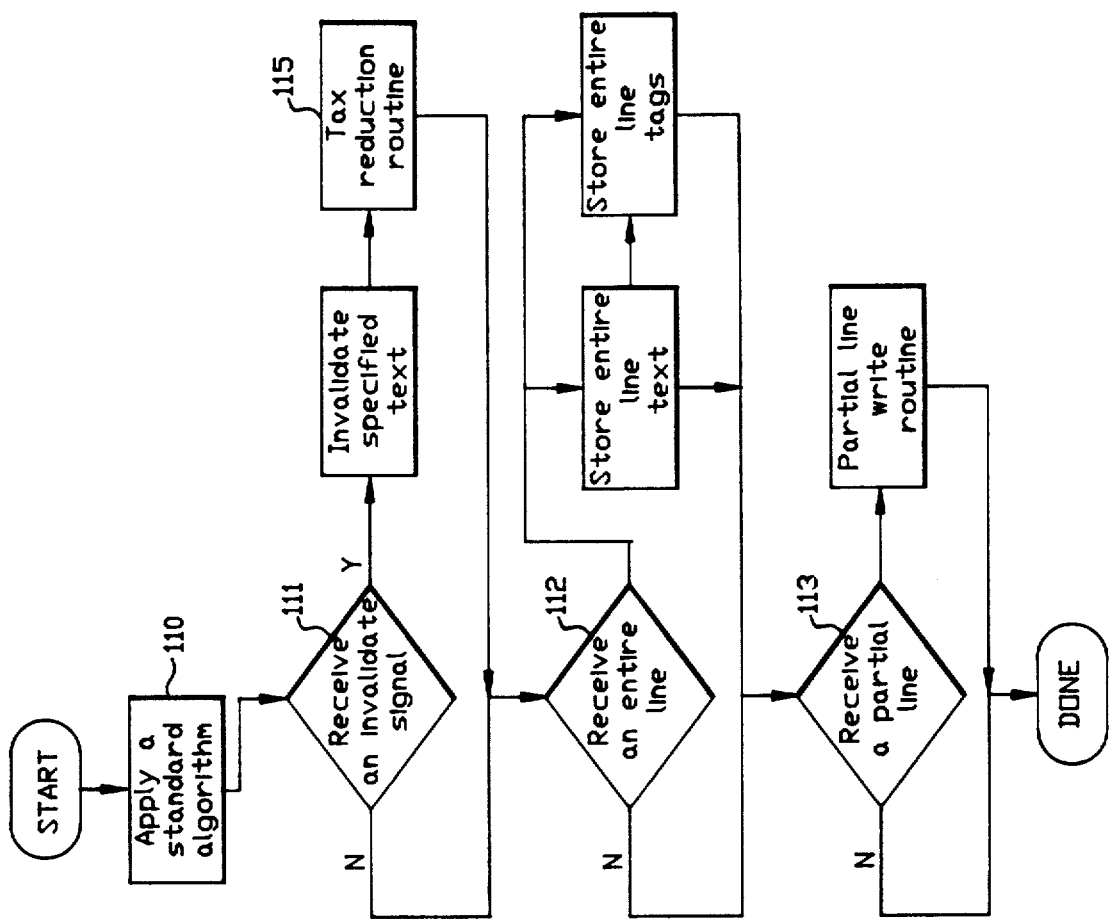
Figure 6E:
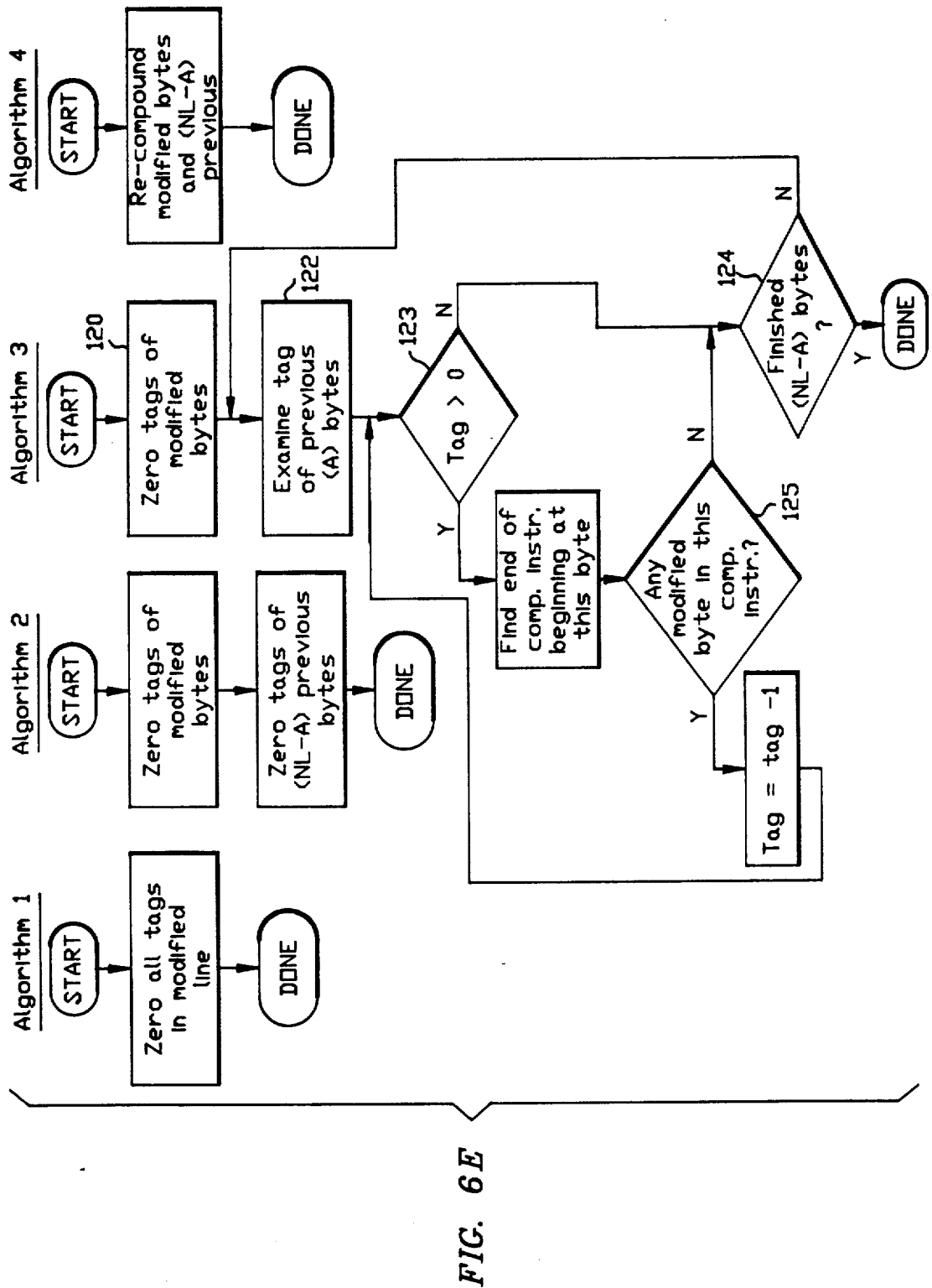

Refer now to FIGS. 6A-6J for an understanding of the procedure of the invention. In the procedure, the alteration of compounding tags to reflect a WRITE to a compounded instruction is termed "tag reduction". This definition accounts for the fact that a zero tag is still valid. Further, when the degree of compounding is greater than 2, the value of the tag may be reduced to a value that is not zero. Relatedly, the first three algorithms illustrated in FIG. 6E are referred to as tag reduction algorithms.

The algorithms of FIG. 6A-6J are shown for the general case in which instructions and data are intermixed, with no knowledge of where each instruction starts, and where compounding tags are generated for each half word of text. Certain optimizations can be made for specific cases. For example, if the computer system has no WRITES into lines containing instructions, no tags need ever be reduced. Furthermore, if there are separate instruction and data caches, a data cache has no use for tags. In another example, if instruction boundaries are known, tags for bytes that do not begin instructions need never be checked for reduction. Also, when checking instruction text bytes preceding modified bytes for tag reduction, checking can stop at the first tag bit, beginning an instruction, that is already zero.

In FIGS. 6A-6J, it is assumed that compounding tags are interpreted as follows: the value of a tag is the number of following instructions that are compounded with the current instruction. When an instruction is fetched by a CPU, compounding tags associated with a first byte of an instruction, that is, the beginning or boundary of the instruction, are used; others are ignored. This is not to imply that the algorithms cannot be used for alternative tag representations. Rather, the example is selected for illustration only. The algorithms further assume no compounding across the boundary of a cache line. Transline compounding complicates tag reduction. One potential solution would be to detect a modification close enough to the beginning of a line to cause tags in the previous line to be reduced. The cache can invalidate all or part of a previous line and set an appropriate flag signaling to other caches and the main memory the occurrence of reduction. Alternatively, the cache can request the line in a cache coherency protocol and reduce the appropriate tags, in which case the text is considered to be modified.

In FIG. 6A, conventional cache management operations are shown. As the routine practitioner will realize, FIG. 6A illustrates typical memory management techniques as modified before compounding in the hierarchical memory organization illustrated in FIG. 3. Thus, the virtual address 74 of text being referenced is translated into a real address by a routine address translation look-up 75 which checks the page number of the address against a directory of pages resident in the main memory. If the page is resident in the main memory, there is no page fault and the negative exit is taken from decision 76, the real address 77 is assembled and cache operations are commenced. Assuming that the text whose real address is illustrated by 77 is altered or modified by a WRITE, one of two consistency routines is invoked to update the copy of the modified text in the main memory. Thus, when a WRITE occurs, one of the two branches will be taken out of the cache-type decision 78. The left-hand exit assumes a WRITE-through cache routine wherein the copy of the text in the main memory is updated concurrently with updating the text in the cache. Alternatively, a WRITE-back routine in step 80 permits the text to be modified while it is in the cache and then ensures that the main memory copy is updated by writing the cache line back to the main memory at some later time. The branches out of step 78 rejoin at step 81 where a cache coherency routine is invoked to ensure consistency between all caches and main memory.

Assuming that the page containing the requested text is not in main memory (and, therefore, not in the cache), the positive exit is taken out of the page fault step 76, routine page fault handling is invoked in step 83, the new page fetched from auxiliary storage is subjected to compounding in step 84, and the page and compounding tags are stored in main memory in step 85. After this, the procedure executes as described above.

A WRITE-through cache routine for step 79 of FIG. 6A is illustrated in FIG. 6B. This routine follows the usual WRITE-through policy in which text modification causes the copy of the text in the main memory and a cache to be updated concurrently. In this regard, if instruction execution requires reference to cached text, the first determination is whether the reference is a WRITE. If not, the negative exit is taken from decision 90. If the referenced text is in the cache, the negative exit is taken from step 91, and decision 92 is encountered. If the addressed text is not an instruction, it is provided to the CPU and the routine is exited. If an instruction fetch is required, the instruction is obtained and the instruction and its associated compounding tags are provided to the CPU for execution. If the addressed text is not in the cache, the positive exit is taken from step 91, and replacement and miss handling routines 94 and 95 are invoked to replace a line in the cache with the line containing the addressed instruction. Such routines are known in the art; the examples shown in FIGS. 6F and 6G have been modified to include compounding tags. These steps require that a line and accompanying tags to be replaced in the cache first be returned to the memory and then that the line and accompanying tags containing the addressed text be entered in the cache in the place of the line which was returned to memory. Processing then proceeds through decision 92 as described above.

In FIG. 6B, assuming that the addressed text is being written to or modified, the positive exit is taken from decision 90 and the cache is inspected in step 94 to determine whether the text is in the cache. If not in the cache, a miss occurs, the positive exit is taken and a partial line write routine is invoked in step 95 to modify the text in the main memory.

On the other hand, partial line write routines are illustrated in FIGS. 6H and 6J. In FIG. 6H, the modified text is merged in main memory with the line containing its predecessor. A tag reduction routine generates new tags as needed and the modified text and tags are stored. The compounding tag reduction routine is executed at location 74 in FIG. 3; it zeros the compounding tags for the modified text and processes the tags for the (NL-A) bytes preceding the modified text. The alternative partial line write routine of FIG. 6-J assumes that the source of the transferred line performs the tag reduction. In this case, the tag reduction could be executed at location 73 in FIG. 3 and the new tags generated thereby would be transferred to the main memory together with the modified text.

Assuming now that a WRITE is generated and the written-to text is in the cache, a hit occurs and the negative exit is taken from decision 94. In this case, the addressed text is modified in the cache in step 97 while the compounding tags for the instruction are reduced, according to the invention, by a tag reduction routine in step 98. Then, the copy of the instruction is modified in the main memory by the partial line WRITE routine of step 95.

FIG. 6 illustrates a WRITE-back cache routine for ensuring data consistency between main memory and a cache. Upon a WRITE-hit, only the cache copy of the text is altered. Later, when the line is returned to the main memory, the update occurs. In write back, the management policy may require that every line written to the cache be written back to the memory. Alternatively, upon a WRITE-hit, the affected cache line can be marked as "dirty". Later, only "dirty" lines are written back to the main memory. In FIG. 6C, in the event of a reference miss, the positive exit is taken from decision 100 and the line containing the referenced text is swapped from the memory into the cache for a line in the cache by invocation of the replacement and miss handling routines 94 and 95 for which, see FIGS. 6F and 6G. If the reference is not a WRITE reference, the negative exit is taken from step 101 and processing proceeds as described above for step 92 in FIG. 6B. If the reference is a WRITE, the positive exit is taken from decision 101, the modified text is written into the cache and a tag reduction routine according to the invention is invoked to reduce the tags of the modified instruction in step 103.

In FIG. 6D, a cache coherency routine including provision for tag reduction is illustrated. The cache coherency routine is essentially one which is used to ensure that data in a cache is coherent with data which is transferred into the main memory from an auxiliary storage device, or with data which is updated in another cache. The cache coherency routine of FIG. 6D is applicable to any cache in a computer with multiple processors, multiple I/O, and a real memory with multiple caches. Standard coherency algorithms are available for application as represented in step 110. Such algorithms can be understood, for example, with reference to COMPUTER ARCHITECTURE AND DESIGN, A. J. van de Goor, 1989, at pages 492-507.

Three such algorithms are represented in FIG. 6D by the decisions 111, 112, and 113. These algorithms are shown as decision blocks simply for convenience. The algorithms represented by the decision blocks 112 and 113 assume that coherency problems are avoided in real memory by requiring all WRITES to be made to main memory. In the algorithm of decision 112, a WRITE to the main memory results in transfer of an entire line containing the written text to the affected caches. In this algorithm, it is assumed that the write to the memory results in a tag reduction routine executed at the main memory so that the entire line including the modified text and the accompanying tags are provided to the cache. Alternately, if a partial line is transferred as in decision 113, one of the partial line write routines illustrated in FIGS. 6H and 6J is invoked.

Decision 111 represents an algorithm in which an invalidate signal is relied upon to maintain cache coherency. In this case, for so long as the relevant invalidate signal is not activated, whole or partial lines of text may be received by the cache from the main memory. However, when an invalidate signal relating to specified text in the cache is activated, the standard algorithm results in invalidation of the specified text. In the invention, tag reduction, represented by step 115, is activated to alter the compounding tags for (N−1) instructions which may precede the invalidated text in the affected line.

FIG. 6E illustrates four tag management algorithms according to the invention. Any of these routines can be invoked at the appropriate points in the previously-described procedures. The first algorithm, algorithm 1, reduces tags by zeroing all tags in a modified cache line. Algorithm 4 employs the opposite extreme, which is to recompound bytes of the modified instruction and at least (NL-A) bytes which precede and follow the modified byte. In algorithm 2, the compounding tag bits for the modified line are reduced by first zeroing the tag bits for the modified text. Next, the tag bits for the (NL-A) previous bytes are also zeroed and the algorithm is exited.

In algorithm 3 of FIG. 6E, the compounding tag bits for modified text in the instruction cache will be reduced to zero in step 120. Next, tags for the (NL-A) bytes of the cache line preceding the modified text are examined, tag by tag, to determine whether any further compounding tag reduction is required. In this regard, once the address of the modified text is known, its line and line location can be determined to establish a starting point for inspecting the portion of the line which precedes it. Thus, in step 122, a loop is entered in which compounding tag bits for the A bytes preceding the line location reference are inspected. If the value of the tag for the first half word is equal to zero, the negative exit is taken from decision 123 and step 122 is re-entered by way of the negative exit from decision 124. Returning to decision 123, if the value of the tag for the next A bytes being analyzed is greater than zero, the end of the compound instruction beginning at this byte is located and a determination is made whether any other bytes in this compound instruction have been modified. If not, the negative exit is taken from decision 125 back to decision 124. Otherwise, the tag for the A bytes currently under consideration is reduced in value by 1 and the procedure returns to decision 123. Thus, the positive exit from decision 123 will adjust the size of the compound instruction in the portion of a cache line preceding a modified instruction only if bytes in the compound instruction are modified. If the modified instruction was included in the compound instruction preceding it, the tag for the compound instruction would be reduced by 1, eventually eliminating the modified instruction from the compound instruction with the result that the second positive exit from decision 123 will exit the algorithm via the negative exit from step 125 and the positive exit from step 124.

Figure 12:
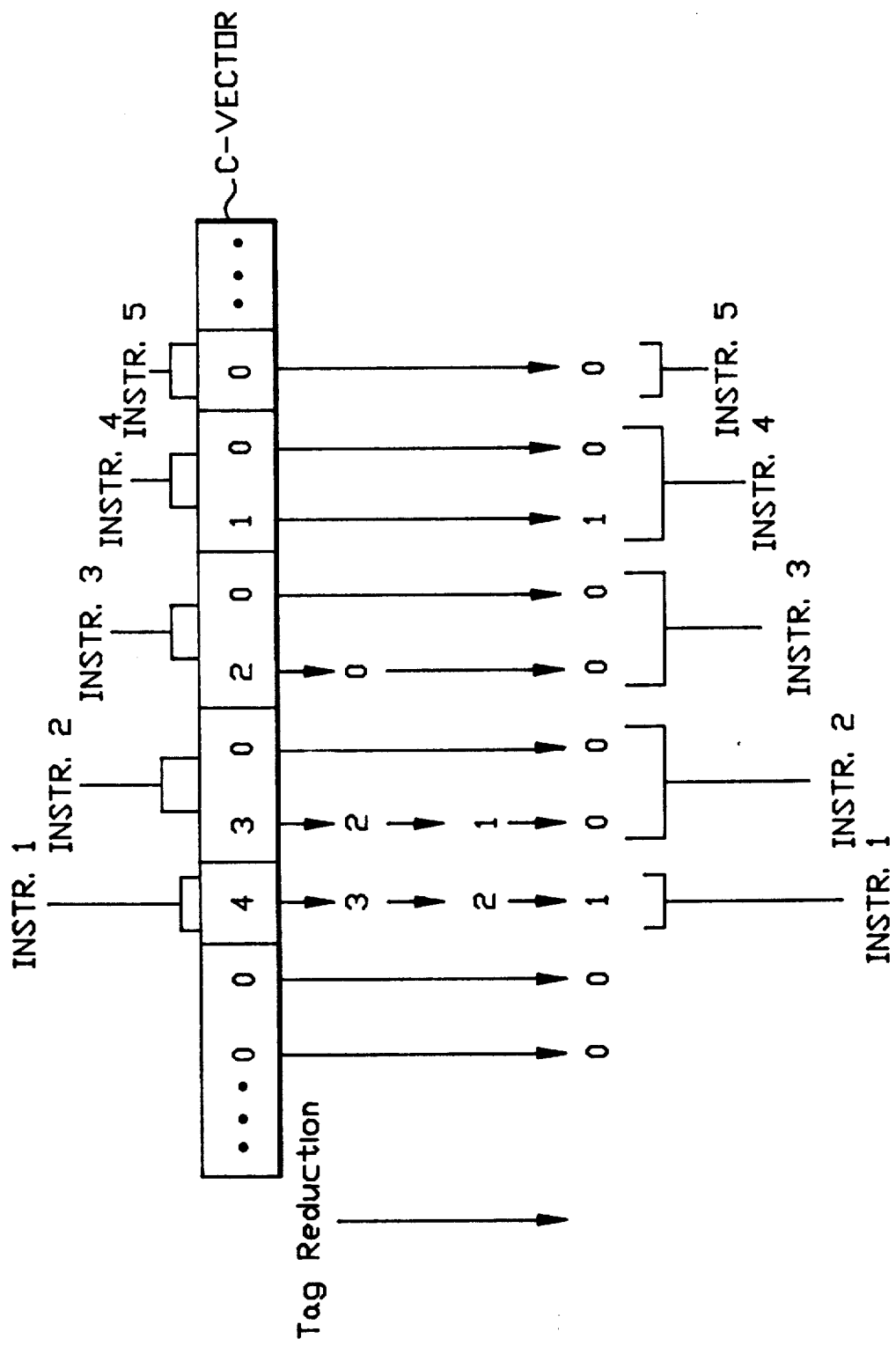
FIG. 12 illustrates the operation of a tag reduction algorithm according to this invention.

Algorithm 3 of FIG. 6E can be understood with reference to FIG. 12 which shows a C-vector for text in an instruction cache where 5 instructions, Instr 1-Instr 5, are compounded. Assume further that A=2, L=4, and N=5. Initially, instruction 1, a 2-byte instruction, has a compounding tag equal to 4 indicating that it is compounded with the 4 following instructions, that is instructions 2-5. Instruction 2, a 4-byte instruction has a compounding tag value of 3 for its first 2 bytes, indicating that it is compounded with the following 3 instructions (Instructions 3-5), and a compounding tag value of 0 for its second 2 bytes. Instruction 3, a 4-byte instruction, has compounding tag values of 2 and 0. Instruction 4, a 4-byte instruction, has compounding tag values of 1 and 0, and instruction 5, a 2-byte instruction has a compounding tag value of 0, indicating that it is not compounded with any following instructions. Assuming instruction 3 is modified, algorithm 3 in FIG. 6E operates on instruction 3 and the (NL-A) bytes preceding it, ignoring all bytes which follow it, including instructions 4 and 5. Relatedly, the compounding tag information for instructions 4 and 5 will be unaltered, while the 2 tags for instruction 3 will be reduced to 0 according to step 120 of algorithm 3. Next, algorithm 3 examines compounding tag information for 2 bytes preceding instruction 3, finds a value of 0, takes the negative exit from step 123 and the negative exit from step 124. Now, the compounding tag information for the first 2 bytes of instruction 2 are examined in step 122, the value is determined to be greater than 0 and the positive exit is taken from step 123. After this exit, the value of 3 for the compounding tag indicates that instruction 5 ends the compound instruction beginning at the first 2 bytes of instruction 2. In decision 125, instruction 3, the modified instruction, is in this compound instruction, so the positive exit is taken, the value of 3 is reduced to 2, and decision 123 is re-entered. This loop continues until the value of the compounding tag for the first 2 bytes of instruction 2 is reduced to 0, in which case, instruction 3 will no longer be included in the compound instruction, and decision 124 will be entered via the negative exit from step 125. Since (NL-A) bytes have not been completed, algorithm 3 returns to step 122 by the negative exit from decision 124. Now, the A bytes preceding instruction 2 are examined, which comprise instruction 1 of the compound instruction. The value of this compounding tag is greater than 0, and the loop, including the positive exits from steps 123 and 125, is traversed until the value of the compounding tag for instruction 1 is reduced to 1, which leaves instruction 1 compounded with instruction 2. Now, the remainder of the (NL-A) bytes preceding instruction 3 will continue to be analyzed by algorithm 3. However, none of the compounding tags for these bytes will be altered because any compound instructions in which they are included will not include the modified text of instruction 3. Thus, algorithm 3 will loop through the negative exit of 125 and 124 until all (NL-A) bytes preceding instruction 3 have been analyzed.

Figure 7:
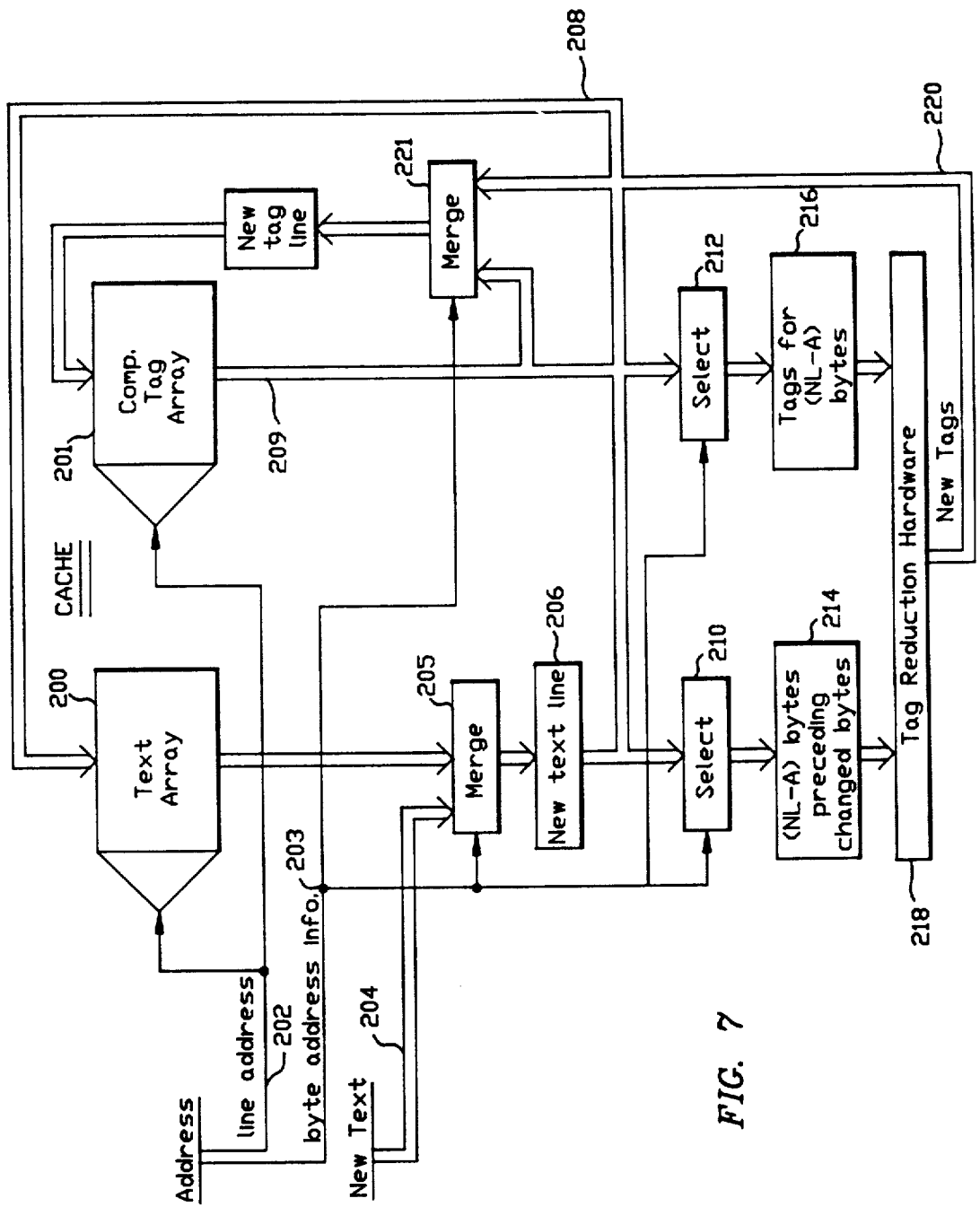
FIG. 7 is a block diagram illustrating a mechanism for compounding tag management in the memory of FIG. 3.

FIG. 7 illustrates a compounding tag management unit which is intended to be used in connection with a compound instruction cache configured as illustrated in FIG. 5B and including a text array portion 200 and a compounding tag array 201. The compounding tag management unit of FIG. 7 responds to the modification of an addressed instruction by operations which effectively implement the third algorithm of FIG. 6E. The first algorithm of FIG. 6E is the trivial case of reducing the tag bit values for an entire line to zero. The second algorithm is actually a special case of the third algorithm. The fourth algorithm is recompounding and can be an extension of the third algorithm.

FIG. 7 illustrates compounding tag management for the special case of tag reduction in the instruction cache, which applies for WRITE-BACK and WRITE-THROUGH caches. In a WRITE-THROUGH cache, the unit of FIG. 7 can be applied similarly for the main memory.

Given the address of referenced cache text, and given that the text is being written to (in effect a "WRITE hit"), the text is modified by provision of the address of the line containing the text on signal line 202 to the text array 200. The address includes the byte address information identifying the location of the modified information in the addressed cache line. This byte address information is provided on signal line 203. The new text produced by writing or otherwise modifying the addressed text is provided at 204 to a conventional merge unit 205. The merge unit 205 receives the entire line which is addressed and inserts the new text into the addressed line at the byte address in the line indicated by the information on signal line 203. A new text line results which is returned to the cache text array on signal line 208.

The line address and byte address information which define the cache line and line location of the modified text also identify the related compounding tag information for the text. Thus, provision of the line address on signal line 202 to the compounding tag array will extract an array of compounding tags for the addressed line of text, and the byte address information will indicate which of the addressed array of tags is for the modified text. Assuming that compounding tag information for the addressed line is in the format of the C-vector in FIG. 4, the vector for the addressed line will be brought to a select circuit 212. Similarly, the entire new text line will be brought to a select circuit 210. The text line select circuit 210 uses the location of the modified text in the line to select the (NL-A) bytes in the line which precede the changed text. This is registered at 214. Similarly, the selector 212 selects the compounding tags from the C-vector for the (NL-A) bytes registered at 214. These compounding tags are registered at 216. In response to the text bytes registered at 214 and the tags registered at 216, tag reduction hardware 218 generates new tags representing the reduction of tags according to the third algorithm of FIG. 6E. These new tags are provided on signal line 220 to a merge circuit 221. The merge circuit 221 initially receives the C-vector for the addressed cache line and the byte address information identifying line location of the modified text. This byte address information precisely identifies the location of the compounding tag in the addressed C-vector for the addressed cache line. This tag is replaced by a hard-wired zero provided to the merge circuit on signal line 222. Once the merge circuit 221 knows the location in the C-vector of the compounding tag for the modified text, it inserts the new tags on signal line 220 into the C-vector for the (NL-A) bytes which precede the modified text. The new tag line which results is returned to the tag array 201 to be stored at the line address location.

Figure 8:
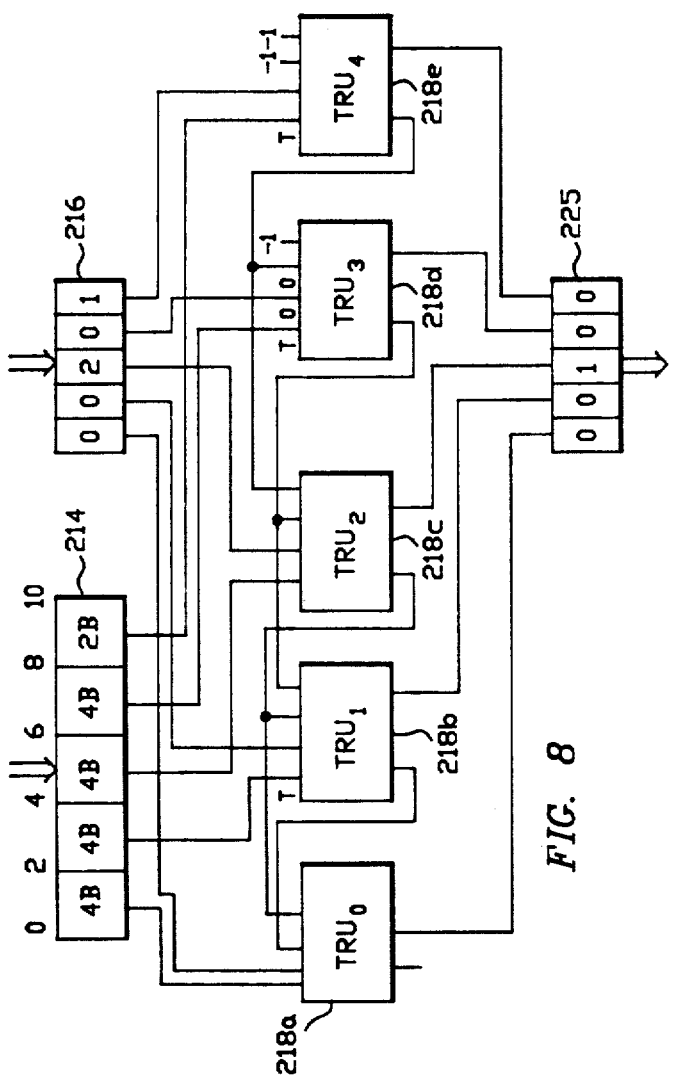
FIG. 8 is a more detailed block diagram of tag reduction hardware in the mechanism of FIG. 7 in the case where up to 3 instructions can be compounded.
Figure 9:
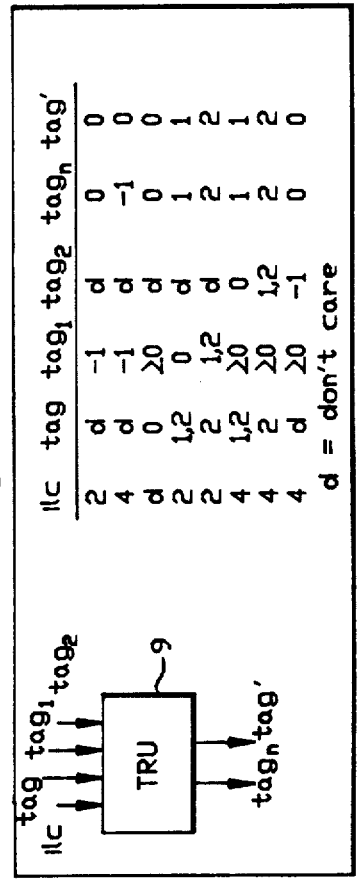
FIG. 9 is a table illustrating the operation of a tag reduction unit in FIG. 8.

FIGS. 8 and 9 illustrate tag reduction hardware for a compounding example in which 2 and 4 byte instructions are compounded, the compounding scope embraces up to 3 instructions, and a 2 bit compounding tag is provided for each text half word. In this case, the maximum size of a compounded instruction would be $3 \times 4 = 12$ bytes. Since the tag for the first half word of the modified text has already been reduced, 2 of the 12 bytes are accounted for and only the 10 bytes preceding the first half word in the modified text need be inspected. These 10 bytes determine the size of the register 214. Similarly, provision of a 2 bit tag (to encode up to 3-way compounding) means that the tag register 216 must accommodate 5 compounding tags of 2 bits each, or 10 bits in total.

The tag reduction hardware 218 includes a plurality of tag reduction units (TRU) 218a to 218e. Refer now to FIG. 8 and FIG. 9, each of the TRUs 218a to 218e is associated with a respective half word in the register 214. As the TRU 9 in FIG. 9 (which is representative of all of the TRUs in FIG. 8) illustrates there are 4 inputs to the unit, in response to which the unit produces 2 outputs. Unit inputs are instruction length code (ILC) for the instruction in which the unit's half word is included, the compounding tag for that half word, a tag input denoted as $tag_1$ and a tag input denoted at $tag_2$. The inputs $tag_1$ and $tag_2$ represent tags of the next 2 half words adjacent the half word with which the unit is associated. The TRU 9 produces 2 outputs $tag_n$ and $tag'$. The output $tag'$ is the reduced tag for the unit half word; the output $tag_n$ is fed backward to the units which represent half words in the set of (NL-A) half words whose compounding tags are being reduced.

Since the tagging representation selected in the example of FIGS. 8 and 9 uses 2 bits per tag to indicate the number of instructions compounded with this instruction, the tag values are zero, 1, and 2. The TRU implementation sets the compounding tags so that no compound instruction extends into the text bytes that were modified. The result is that the compounding tag values for the (NL-A) half words which immediately precede the modified text decrease or go to zero depending upon the next compounding tag value and the number of bytes between a given byte and the modified bytes. The tag value $tag_n$ is used internally and can assume any one of the values $-1$, 0, 1, or 2. For any instruction that was all or partially modified, this tag is given value $-1$. The other output, $tag'$, is the new compounding tag value for the half word after reduction according to the third algorithm of FIG. 6E.

Refer now to FIG. 8 for an explanation of the operation of the tag reduction hardware. In FIG. 8, the TRU 218e is associated with a half word which immediately precedes the first half word of the modified text. Its 2 inputs $tag_1$ and $tag_2$ are hardwired to a value of $-1$, which indicates that the text immediately succeeding this half word have been modified. In the TRU 218d, the $tag_2$ input is hardwired to a value of $-1$ to account for modification of the addressed text.

As an example, assume that the modified text is the third scalar instruction of a compounded set of 3 scalar instructions. Assume further that the instruction immediately preceding it is a 2 byte instruction preceded by a 4 byte instruction. Assume that the 4 byte instruction, the first instruction of a compounded set, is itself preceded by a non-compounded 4 byte instruction. In this case, the contents of the register 214 will indicate that the last half word of the register at byte positions 8-9 is occupied by a 2 byte instruction, byte positions 4-7 by a 4 byte instructions and byte positions 0-3 by another 4 byte instruction. The compounding tags for the half words will be as shown in the register 216. Since the last half word is the 2 byte instruction with which the modified instruction is compounded, it will have a single compounding tag of 2 bits whose value will be set to 1 (decimal) to indicate that this instruction is compounded with its one following instruction. The next compounding tag value will be for the second half word of the 4 byte instruction, this half word being at byte positions 6-7 of the register 214. In the compounding scheme, the compounding bits for this half word are set to zero, since the CPU will ignore them. The compounding tag for the half word at byte positions 4-5 of register 214 will be set to the value of 2 (decimal) because this is the first half word of a compounded instruction and because it has been compounded with its 2 following instructions, that is, the instruction in byte positions 8-9 of the register 214 and the instruction including the first byte of modified text. The instruction at byte position 0-3 being non-compounded, the compounding tag values for its 2 half words are respectively zero and zero. The compounding tag values for this example are shown in sequence in the register 216. The $tag_1$ and $tag_2$ inputs to the TRU 218e are both "$-1$". In this case, the outputs for this unit are given in the first line of the table in FIG. 9, that is, $tag_n$ and $tag'$ are both equal to "zero". Now the inputs to TRU 218d, representing the second half word of the 4 byte instruction at positions 4-7 are as follows: $tag_2 = -1$, $tag_1 = 0$, tag=0, and ILC=4. This unit outputs $tag_n$ and tag' values according to line 3 of the table in FIG. 9. Resultantly, the TRU input values at the unit 218c, which represents the first half word in the 4 byte instruction beginning the compounded 3 instruction set, are as follows: $tag_1$ and $tag_2 = 0$, tag=2, and ILC=4. This produces an output given by the sixth line of the table in FIG. 9. Since the 4 byte instruction at byte locations 0-3 is non-compounded, its tag value is 0 and the outputs of the TRUs 218a and 218b are given by the third line of FIG. 9.

The reduced tag values for the example just given are illustrated at 225. Now, the value of the compounding tag for the 2 byte instruction at byte locations 8-9 is 0, indicating that this instruction is not compounded with the following instruction, the value for the second half word of the 4 byte instruction at locations 4-7 is 0, and the value of the compounding tag for the first half word of the 4 byte instruction at locations 4-7 is 1 indicating that this instruction is compounded with its 1 following instruction, namely, the 2 byte instruction at locations 8-9.

Figure 10:
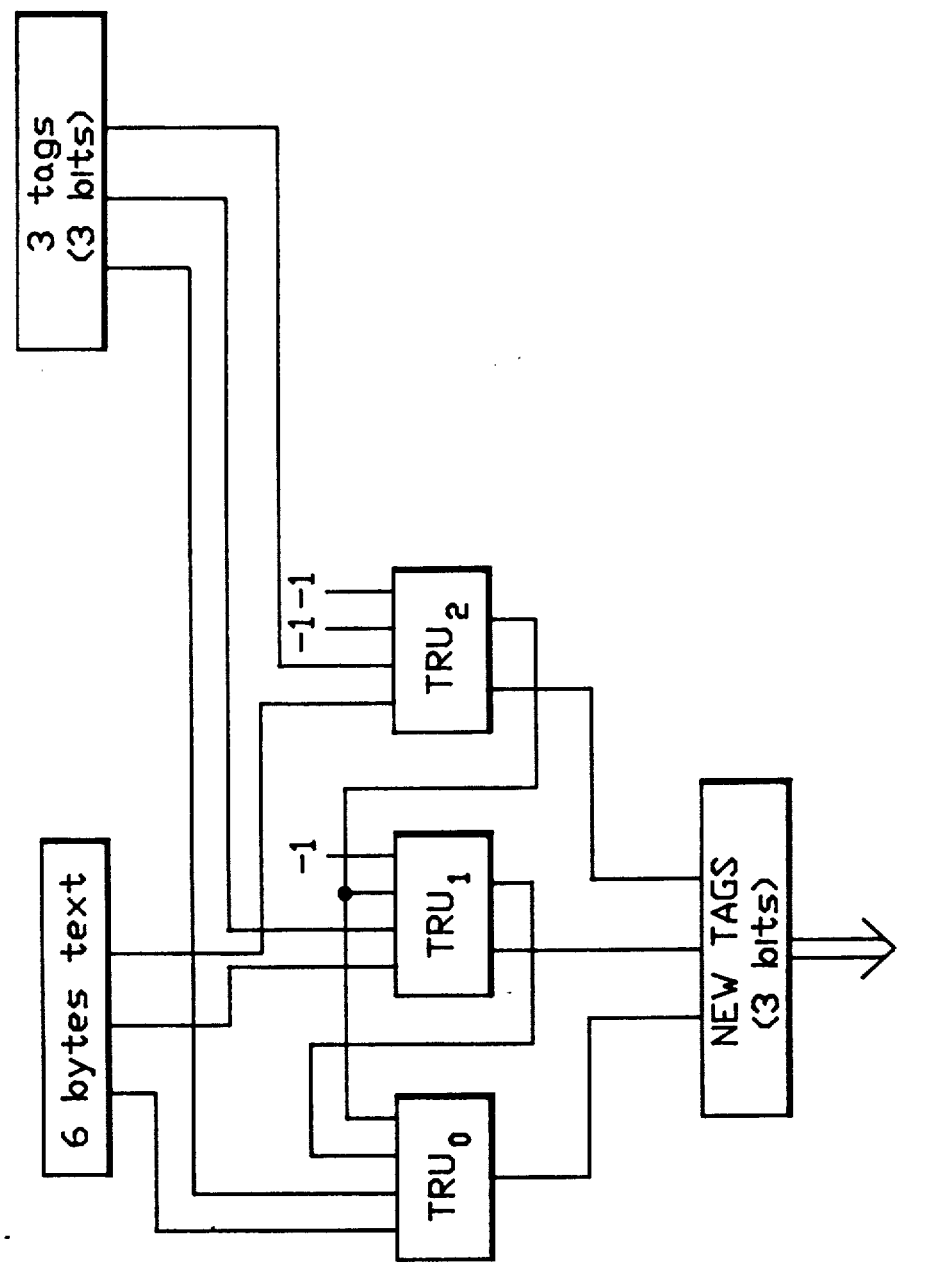
FIG. 10 is a more detailed block diagram of tag reduction hardware for the compounding of up to 2 instructions.

FIG. 10 illustrates tag reduction hardware for the case where N=2, L=4, and A=2. As the Figure shows, the auxiliary tag $tag_n$ can still assume a value of −1, which indicates that the value of the compounding tag for its associated instruction has been reduced.

Figure 11:
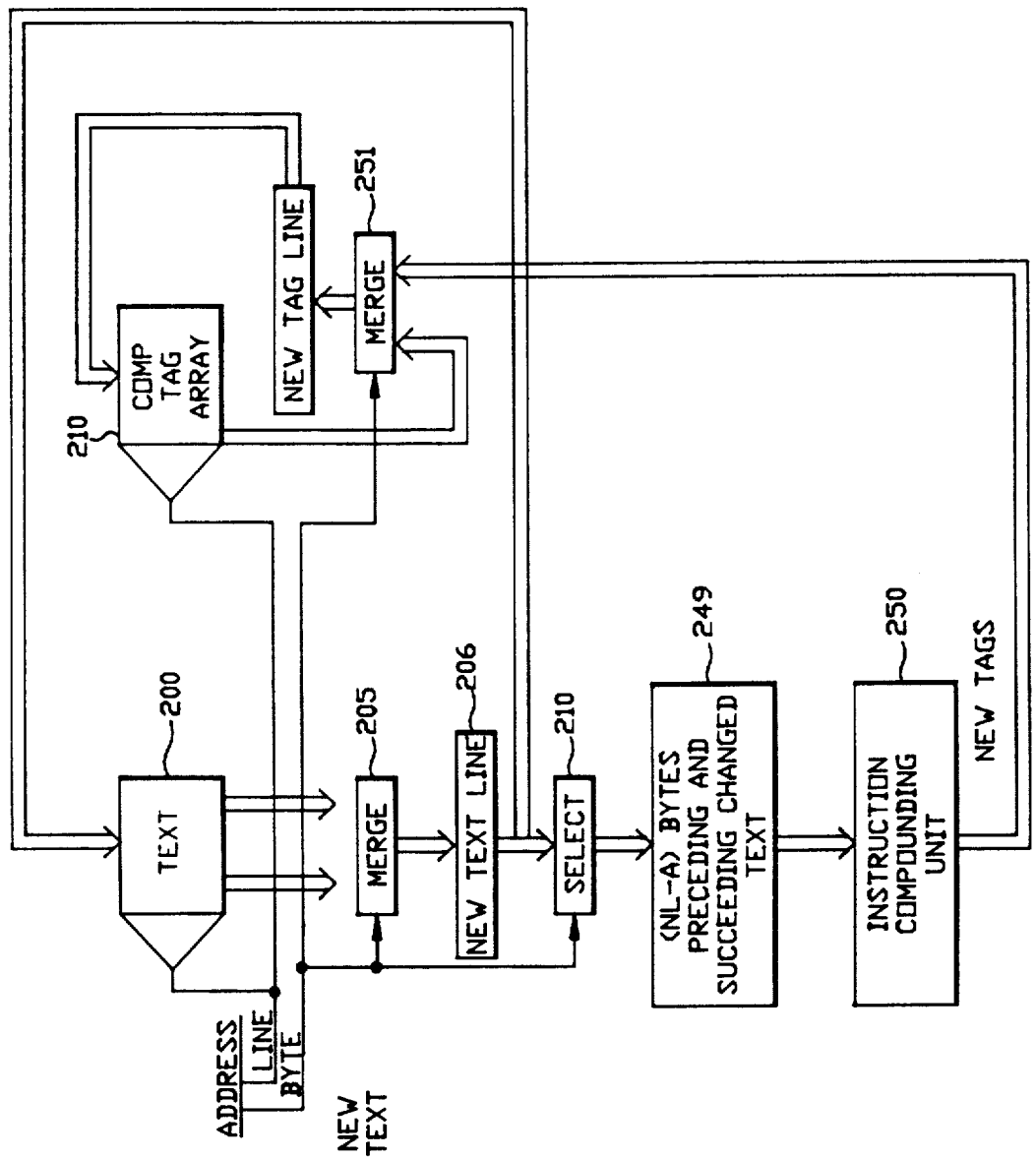
FIG. 11 is a table illustrating operation of a tag reduction unit in FIG. 10.

FIG. 11 illustrates algorithm 4 of FIG. 6B, that is, recompounding in response to text modification. The elements in FIG. 11 which are numbered identically with corresponding elements in FIG. 7 are the equivalents of those elements. In this regard, when new text is produced by a WRITE, the new text is merged at 205 with the line containing its predecessor from the cache 200. The new text line at 206 is fed back to the cache 200 to replace its predecessor, while the select circuit 210 selects a portion of the line centered on the modified bytes and extending (NL-A) bytes on either side of the modified text. Instructions in the selected text are compounded by the instruction compounding unit 50, which generates new tags for this portion of text. The new tags are inserted in the C-vector for the addressed align at 251, and the new tag line is placed in compounding tag array 201.

In the foregoing discussion of FIGS. 6A through 12, the tag reduction and tag recompounding management solutions are both described with reference to a text stream which includes multi-byte instructions of variable length which are aligned on 2 byte boundaries. Further, the description assumes that a compounding tag is generated for every 2 bytes of text, whether or not the 2 bytes contain an instruction op code. This is in no way meant to limit the application of the tag management policies and mechanisms of this invention. Generally, in a computer system which compounds up to N instructions, tag reduction must consider compounding tag modification for the largest possible compound instruction. Therefore, in general, tag reduction looks to the N−1 possible instructions which precede modified text in memory. Similarly, when tag recompounding is selected as the tag management policy, it is best to consider for recompounding as many instructions as possible on either side of the modified text in order to maximize the opportunity for optimum compounding. In this application, recompounding considers the N−1 instructions preceding and following the modified text. Other implementations may extend this number.

While we have described several preferred embodiments of our invention, it should be understood that modifications and adaptations thereof will occur to persons skilled in the art. Therefore, the protection afforded our invention should only be limited in accordance with the scope of the following claims.

We claim:

1. In a computer system capable of concurrently executing up to N instructions in a sequence of scalar instructions, the sequence including compounding tags associated with the scalar instructions, the compounding tags having values conditioned to indicate how many instructions are to be concurrently executed, a mechanism for managing compounding tag values of scalar instructions which are stored in a real memory of the computer system, the mechanism comprising:

a merging means connected to the real memory for merging a modified instruction from the real memory with non-modified instructions in the real memory; and a tag reduction unit connected to the merging means and to the real memory for reducing the values of the compounding tags of the modified instruction and up to N−1 of the instructions in the real memory with which the modified instruction could be compounded.

2. The mechanism of claim 1, wherein the tag reduction unit reduces the values of the compounding tags of the modified instruction to zero.

3. The mechanism of claim 2, wherein the tag reduction unit reduces the values of the compounding tags of all of the instructions in the real memory with which the modified instruction could be compounded to zero.

4. The mechanism of claim 1 wherein compounding tags are provided for every two bytes in the sequence of scalar instructions.

5. The mechanism of claim 1, wherein L is the length in bytes of the longest scalar instruction capable of being compounded with another scalar instruction, A is the number of bytes covered by a compounding tag, and wherein the tag reduction unit reduces the values of the compounding tags of up to (NL-A) bytes preceding the modified instruction in the sequence of scalar instructions.

6. The mechanism of claim 1, wherein the compounding tags are generated by an instruction compounding unit in the real memory of the computer system.

7. The mechanism of claim 6, wherein the real memory of the computer system includes a high-capacity, medium speed main memory and a small-capacity, high speed cache connected to the main memory, to the merging means and to the tag reduction unit.

8. The mechanism of claim 7, wherein the instruction compounding unit is connected to the main memory and to the cache for generating compounding tags for instructions in the cache.

9. The mechanism of claim 7, wherein the instruction compounding unit is connected to the main memory for generating compounding tags for instructions in the main memory.

10. In a computer system which receives a sequence of scalar instructions and includes compounding means for grouping instructions for concurrent execution by generating compounding tags for groups of up to N instructions, the compounding tags having values indicating the number of instructions in the groups, a method for managing the compounding tags of instructions stored in the real memory of the computer system, the method including the steps of:

during operation of the computer system, modifying an instruction stored in the real memory;

merging the instruction with instructions in the real memory;

reducing the value of the compounding tag for the real instruction to zero; and reducing the values of the compounding tags of up to $N-1$ instructions in the real memory with which the instruction can be compounded.

11. The method of claim 10, wherein the step of reducing the values of the compounding tags of $N-1$ instructions includes reducing the value to zero.

12. The method of claim 10, wherein L is the length in bytes of the longest scalar instruction of the sequence which can be compounded with another scalar instruction of the sequence and A is the number of bytes associated with a compounding tag, the step of reducing the values of the compounding tags of $N-1$ instructions including reducing the values of the compounding tags of up to (NL-A) bytes in the sequence preceding the instruction.

13. The method of claim 12, wherein the values of the compounding tags of the (NL-A) bytes are reduced to zero.

14. In a computer system capable of concurrently executing up to N compounded instructions in a sequence of scalar instructions, the sequence including compounding tags which accompany the scalar instructions, the compounding tags having values conditioned to indicate how many instructions are compounded for concurrent execution, a mechanism for managing compounding tag values of scalar instructions which are stored in real memory of the computer system, the mechanism comprising:

a merging means connected to the real memory for merging a modified instruction with non-modified instructions in the real memory; and a recompounding mechanism connected to the merging means and to the real memory for generating compounding tags for the modified instruction and at least $N-1$ non-modified instructions adjacent the modified instruction in real memory.

15. The mechanism of claim 14, wherein L is the length in bytes of the longest instruction which can be compounded with another instruction and A is the number of bytes to which a compounding tag applies, the recompounding mechanism being for generating compounding tags for the modified instruction and at least (NL-A) bytes adjacent the modified instruction.

* * * * *